(12) United States Patent
Isozaki

(10) Patent No.: US 6,356,178 B1
(45) Date of Patent: Mar. 12, 2002

(54) METHOD AND APPARATUS FOR ENCODING VIDEO MATERIAL FOR RECORDING

(75) Inventor: Masaaki Isozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/221,459

(22) Filed: Dec. 28, 1998

(30) Foreign Application Priority Data

Dec. 29, 1997 (JP) ......................................... PO9-369264

(51) Int. Cl.[7] ........................... H04N 5/917; H04N 7/26
(52) U.S. Cl. ................... 336/109; 375/240.02; 386/125; 386/46; 348/722
(58) Field of Search .................................. 386/109, 111, 386/46, 131, 125, 126, 112, 113, 124, 52, 55, 56; 348/722; 375/240.26, 240.02, 240.29, 240.14, 240.03; H04N 5/917

(56) References Cited

U.S. PATENT DOCUMENTS

| | | | | |
|---|---|---|---|---|
| 5,675,379 A | * | 10/1997 | Kato et al. .................. | 386/109 |
| 6,192,083 B1 | * | 2/2001 | Linzer et al. .......... | 375/240.29 |
| 6,219,359 B1 | * | 4/2001 | Budge et al. ............... | 370/538 |
| 6,229,850 B1 | * | 5/2001 | Linzer et al. .......... | 375/240.11 |
| 6,243,417 B1 | * | 6/2001 | Obikane et al. ....... | 375/240.03 |

* cited by examiner

Primary Examiner—Vincent F. Boccio
(74) Attorney, Agent, or Firm—Frommer Lawrence & Haug LLP; William S. Frommer; Dennis M. Smid

(57) ABSTRACT

An encoding method and apparatus in which, in assigning bits to compressed video data recorded across plural recording areas or layers, bit assignment is evaluated as to whether or not non-permissible difference in picture quality is not produced under given encoding conditions, from one recording area or layer to another, and an optimum condition is presented. The bit assignment is done from one encoding unit to another responsive to the encoding difficulty corrected responsive to the as-changed picture type and the number of bits accorded to the entire encoding material [SUPPLY_BYTES] and the variation in the assigned quantities to respective recording areas is detected to evaluate whether or not the picture quality difference is allowable. If the picture quality difference is not allowable, a warning is displayed. If the picture quality difference is allowable, the number of the target bits is calculated on the picture basis responsive to the as-corrected encoding difficulty and [SUPPLY_BYTES] to formulate a control file for an encoder. If encoding is not done under the initial conditions, an optimum value of the quantity of bit assignment is presented.

16 Claims, 39 Drawing Sheets

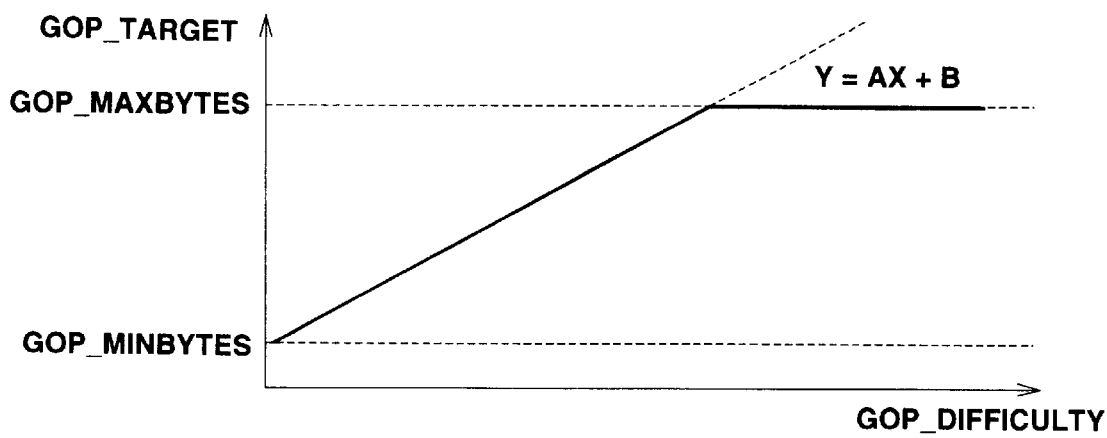

$\Sigma y = A \times Sx + B \times n$
WHERE $A = (SUPPLY\_BYTES - MINBYTES \times n) / DIFFICULTY\_SUM$
FROM $\Sigma y = SUPPLY\_BYTES, \Sigma x = DIFFICULTY\_SUM$
$n = picture\_number, B = MINBYTES$ THUS, THE TARGET QUANTITY OF EACH PICTURE IS
$target(k) = A \times difficulty(k) + B$ ALSO, THE TARGET BIT QUANTITY OF EACH PICTURE IN GOP IS
$target = GOP\_TARGET \times difficulty / GOP\_diff$

FIG.9

OCCUPANCY_DOWN (k) = OCCUPANCY_UP (k) − + TARGET (k)
OCCUPANCY_DOWN (k + 1) = OCCUPANCY_DOWN (k) + SYSTEM_SUPPLY (k)

SYSTEM_SUPPLY (k) = MAXRATE * TW
TW: 1/29. 97 (NTSC) 1/25 (PAL)

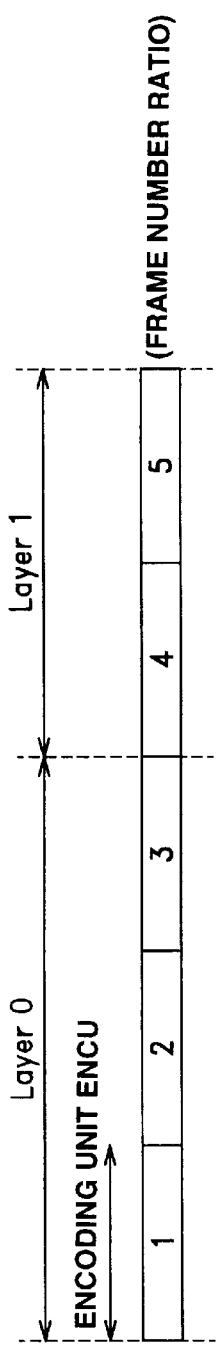
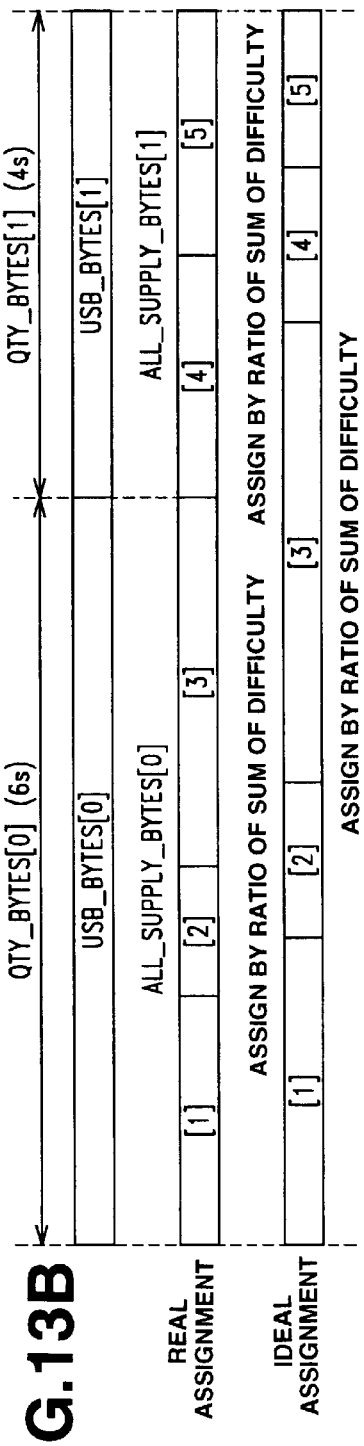
FIG.13A
FIG.13B

| ENCU_nb | Layer | Frame_nb | Total_diff | Supply | Rate(s/n) | IDEAL ASSIGNMENT Supply | Rate(s/n) |
|---|---|---|---|---|---|---|---|
| 1 | 0 | 1n | 2d | 2.0s | 1.0 | 2.5s | 2.5 |
| 2 | 0 | 1n | 1d | 1.0s | 0.5 | 1.25s | 1.25 |
| 3 | 0 | 1n | 3d | 3.0s | 1.5 | 3.75s | 3.75 |
| 4 | 1 | 1n | 1d | 2.0s | 1.0 | 1.25s | 1.25 |
| 5 | 1 | 1n | 1d | 2.0s | 1.0 | 1.25s | 1.25 |

ENCU1, 3 RATE IN SHORTAGE COMPARED TO DIFFICULTY

FIG.14

| ENCU_nb | Layer | Frame_nb | Total_diff | Angle | Supply | Rate(s/n) |
|---|---|---|---|---|---|---|
| 1 | 0 | 2n | 2d | - | 1.6s | 0.8 |
| 2 | 0 | 1n | 1d | Angle1 | 1.0s | 1.0 |
| 3 | 0 | 2n | 3d | - | 2.4s | 1.2 |
| 4 | 0 | 1n | 1d | Angle1 | 1.0s | 1.0 |
| 5 | 1 | 2n | 1d | - | 0.75s | 0.375 |
| 6 | 1 | 2n | 1d | Angle2 | 1.5s | 0.75 |
| 7 | 1 | 2n | 3d | - | 2.25s | 1.125 |
| 8 | 1 | 2n | 1d | Angle2 | 1.5s | 0.75 |

ANGLE 2 RATE LOW COMPARED TO ANGLE 1 RATE

FIG.24

AVR_rate=12s/12n

ALL_ANGLE_BYTES[0]=AVR_RATE×(1n+1n)=2s
ALL_ANGLE_BYTES[1]=AVR_RATE×(1.5n+1.5n)=3s
ALL_SUPPLY_BYTES[0]=6s−ALL_ANGLE_BYTES[0]=4s
ALL_SUPPLY_BYTES[1]=6s−ALL_ANGLE_BYTES[1]=3s

Gr_avr=7s/9d
GR[0]=(4s/5d)/Gr_avr=1.03
GR[1]=(3s/4d)/Gr_avr=0.96

| ENCU_nb | Layer | Frame_nb | Total_diff | Angle | Supply | Rate | Supply | Rate |
|---|---|---|---|---|---|---|---|---|
| 1 | 0 | 2n | 2d | — | 1.6s | 0.8 | 1.33s | 0.67 |
| 2 | 0 | 1n | 1d | Angle1 | 1.0s | 1.0 | 1.0s | 1.0 |
| 3 | 0 | 2n | 3d | — | 2.4s | 1.2 | 2.0s | 1.0 |
| 4 | 1 | 1n | 1d | Angle1 | 1.0s | 1.0 | 1.0s | 1.0 |
| 5 | 1 | 2n | 1d | — | 0.5s | 0.25 | 0.66s | 0.33 |
| 6 | 1 | 2n | 1d | Angle2 | 2.0s | 1.0 | 1.0s | 1.0 |
| 7 | 1 | 2n | 3d | — | 1.5s | 0.75 | 2s | 1.0 |
| 8 | 1 | 2n | 1d | Angle2 | 2.0s | 1.0 | 1.0s | 1.0 |

ANGLE 2 RATE EQUAL TO ANGLE 1 RATE
ENCU 3 RATE EQUAL TO ENCU 7 AFTER ADJUSTING
TO OPTIMUM VALUE OF USB_BYTES

AVR_rate=12s/12n
ALL_ANGLE_BYTES[0]=AVR_RATE×(1n+1n)=2s
ALL_ANGLE_BYTES[1]=AVR_RATE×(2n+2n)=4s
ALL_SUPPLY_BYTES[0]=6s−ALL_ANGLE_BYTES[0]=4s
ALL_SUPPLY_BYTES[1]=6s−ALL_ANGLE_BYTES[1]=2s Gr_avr=6s/9d
GR[0]=(4s/5d)/Gr_avr=1.2
GR[1]=(2s/4d)/Gr_avr=0.75

3s≤CHECK_SUPPLY[0]≤3.66s
2.4s≤CHECK_SUPPLY[1]≤2.93s

5s≤CHECK_USB[0]≤5.66s−>USB_BYTES[0] IS ADJUSTED TO 5.33s
6.4s≤CHECK_USB[1]≤6.93s−>BYTES[1] IS ADJUSTED TO 6.66s

FIG.26

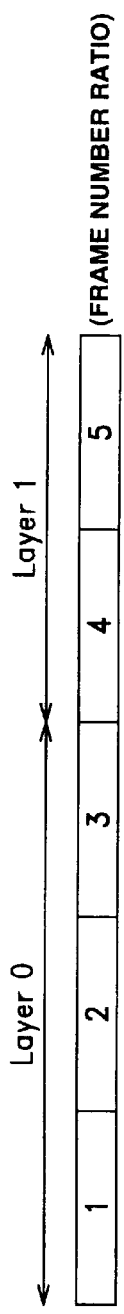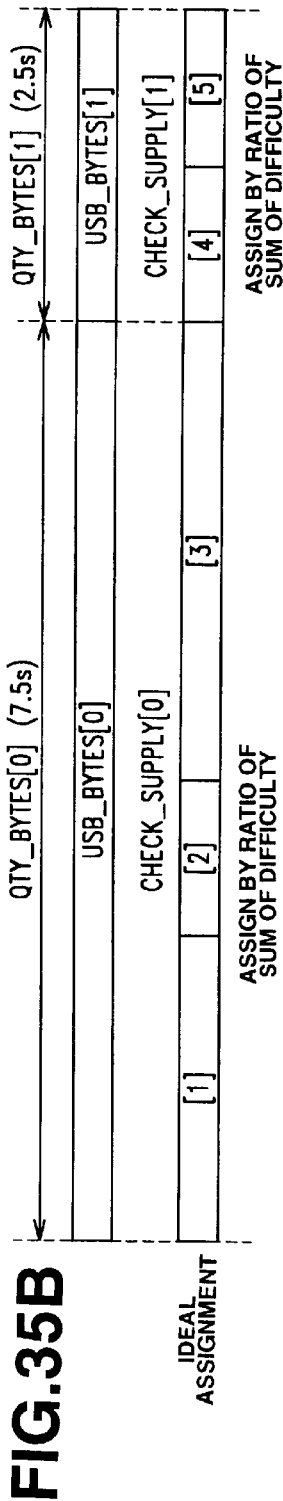
FIG.35A
FIG.35B

| ENCU_nb | Layer | Frame_nb | Total_diff | Supply | Rate(s/n) |
|---|---|---|---|---|---|
| 1 | 0 | 1n | 2d | 2.5s | 2.5 |
| 2 | 0 | 1n | 1d | 1.25s | 1.25 |
| 3 | 0 | 1n | 3d | 3.75s | 3.75 |
| 4 | 1 | 1n | 1d | 1.25s | 1.25 |
| 5 | 1 | 1n | 1d | 1.25s | 1.25 |

FIG.36

| ENCU_nb | Layer | Frame_nb | Total_diff | Supply | Rate(s/n) |
|---|---|---|---|---|---|
| 1 | 0 | 1n | 2d | 2.5s | 2.5 |
| 2 | 0 | 1n | 1d | 1.25s | 1.25 |
| 3 | 0 | 0.5n | 1.8d | 2.25s | 4.5 |
| 4 | 1 | 1.5n | 2.2d | 2.75s | 1.83 |
| 5 | 1 | 1n | 1d | 1.25s | 1.25 |

FIG.38

METHOD AND APPARATUS FOR ENCODING VIDEO MATERIAL FOR RECORDING

BACKGROUND OF THE INVENTION

1. Field of the Invention

This invention relates to an encoding method and apparatus for compressing picture/speech signals for recording the signals in this compressed form on a recording medium. More particularly, it relates to an encoding method and apparatus used with advantage for storing picture/speech signals on so-called package mediums, such as digital video discs (DVDs).

2. Description of the Related Art

In an encoding system for compressing and encoding the video signals for compression for recording on a so-called package medium, such as a digital video disc (DVD) or a video CD, there is routinely used such a method in which the difficulty of encoding of a video material is first measured and bit assignment is then performed, in terms of a frame of each video information as a unit, so that the bits assigned to each frame will be within a given number of bytes comprised in the range of the recording capacity of the package medium based on the measured value of the encoding difficulty. This two-stage encoding processing is hereinafter referred to as a two-path encoding.

FIG. 1 shows a basic structure of an authoring system used for authoring for a digital video disc (DVD) in which the video information is encoded for compression.

In this authoring system, various units used for respective encoding steps, namely a video encoder 22, an audio encoder 21, a sub-title encoder 23, a menu encoder 24, an emulator 26 and a multiplexer 25, a hard disc array (RAID) 4 in which to write the encoding results, and a supervisor 3 for supervising the operation of these units, are interconnected by a network 2.

This authoring system is superior in operating efficiency because the encoding operations for respective parts, such as video or audio, can be performed substantially in parallel.

FIG. 2 shows an illustrative structure of a conventional encoding system in the authoring system shown for example in FIG. 1.

The supervisor 103 controls the video encoding system in its entirety and sets encoding conditions for the respective encoding systems, such as video, audio or menu, while receiving reports on the results of encoding. In the present case, the video encoding conditions are specified by a file [v. enc] and a report is made from the video encoder side on an address [v. adr] on a RAID 104 on which a bitstream on the encoding results is written for the video encoder side and on data [vxxx. aui] required for bitstream multiplexing.

A main controller 111 controls the operation of this video encoding system in its entirety by communication with the supervisor 103 connected to the main controller 111 over the network 102.

Specifically, the main controller 111 accepts the control from the supervisor 103 and the operation by an operator, under control by a graphical user interface (GUI) 114, in order to control the operation of the encoder 112 and a video tape recorder (VTR) 110 by a bit assignment unit 115, an encoder control unit 116 and a VTR control unit 117. This permits the main controller 111 to encode the material being processed, in accordance with the encoding conditions as notified by the supervisor 103, to notify the results of the processing to the supervisor 103. The main controller 111 also accepts the setting byte operator via the GUI unit 114 to modify the detailed conditions for encoding.

The GUI unit 114 of the main controller 111 controls three programs, namely a bit assignment program [BIT_ASSIGN], an encoder control program [CTRL_ENC] of an encoder control program and a VTR control program of the VTR control unit 117.

The bit assignment unit 115 determines, on the frame basis, the conditions for encoding processing in accordance with the encoding conditions file [v. enc] notified from the supervisor 103 to notify he control data under these conditions to the control unit 116 in accordance with the file form [CTL file].

The bit assignment unit 115 then sets bit assignment in the encoding processing and modifies the so-set conditions depending on the operator's actuations. When the compressed video data D2 is recorded on the RAID 104, the bit assignment unit 115 notifies the address data [v. adr] on the RAID 104, having the video data D2 written therein, along with the information [vxxx. aui] such as the data quantity required in a downstream side multiplexing operation, to the supervisor 103.

An encoder control unit 116 controls the operation of the encoder 112 in accordance with the control file [CTL file] notified from the bit assignment unit 115. The encoder control unit 116 notifies data on encoding difficulty [Difficulty] to the bit assignment unit 115 on the frame basis. When the video data D2 is recorded on the RAID 104, the recording address data [v. adr] and data required for subsequent multiplexing [vxxx. aui] is notified to the bit assignment unit 115.

The VTR control unit 117 controls the operation of the video tape recorder (VTR) 110 in accordance with the editing list notified from the supervisor 3 to reproduce the material of a desired editing subject.

The video tape recorder (VTR) 110 reproduces the video data D1 recorded on the magnetic tape to output the reproduced data to the encoder 112 in accordance with the editing list communicated from the supervisor 103 via the main controller 111.

The encoder 112 has its operation switched in accordance with the conditions notified from the supervisor 103 via main controller 111 to encode the video data D1 outputted by the VTR 110 by compression in accordance with the MPEG (Moving Pictures Experts Group) technique.

The encoder 112 at this time notifies the results of the encoding processing to the main controller 111 which then controls the encoding conditions for the data compression to control the quantity of generated bits. This permits the main controller 111 to grasp the amount of bits generated on data compression on the frame basis.

At the time of preliminary setting the encoding conditions for two-path encoding, the encoder 112 simply compresses video data D1 to notify the results of processing to the main controller 111. However, at the time of ultimate data compression processing, that is encoding per se, compressed video data D2 is recorded on the RAID 104 and the addresses for the recorded data and the data quantity etc are notified to the main controller 111.

A monitor device 113 is configured for monitoring the video data D2 compressed by the encoder 112. This video encoding system is able to perform so-called pre-view of ascertaining the results of data compression by an operator with the aid of the monitor 113 as the occasion may demand. The operator actuates the main controller 111 based on the results of the preview to modify the details of the encoding conditions.

The MPEG is a system of compressing data by removing redundancy in the time domain by motion compensated prediction. In this MPEG system, there are used three sorts of the encoded pictures, namely an intra-picture (I-picture) encoded within one frame, a predictive picture or a P-picture, encoded on predicting the present from a past picture, and a bidirectionally predicted picture (B-picture) encoded on prediction from a past picture and a future picture.

These pictures are grouped into a unit termed a group-of-pictures GOP in which there is contained at least one I-picture.

The conventional two-path encoding operation is explained with reference to the structure of a video encoding system shown for example in FIG. 1.

FIG. 3 shows a basic processing sequence for two-path encoding in the conventional video encoding system shown in FIG. 2.

First, at step S51, the encoding conditions [v. enc], such as the total bit quantity or the maximum rate, assigned to the video information, via the network 102 from the supervisor 103. The encoder control unit 116 is set in accordance with these encoding conditions.

Then, at step S52, the encoder control unit 116 measures the encoding difficulty (Difficulty) of the material for encoding, using the encoder 112. At this time, the dc values or the motion vector quantity ME of each pixel in the material are measured simultaneously. At this time, the dc value of each pixel and the motion vector magnitude ME are measured simultaneously. A file is formulated on the basis of the measured results.

The encoding difficulty is actually measured in the following manner.

The video material, as an encoding material, is reproduced from a digital video cassette as a master tape by the VTR 110.

An encoder control unit 116 measures the encoding difficulty of the video information D1 reproduced by the VTR 111 via encoder 112. Here, the number of quantization steps is set to a fixed value, at the time of encoding, to measure the quantity of generated bits. In a picture having abundant movements and hence high frequency components, the amount of generated bits is increased, whereas, in a still picture or a picture having abundant flat portions, the amount of generated bits is decreased. This magnitude of the generated bit quantity is a measure of the encoding difficulty.

At the next step S53, the encoder control unit 116 executes a bit assignment calculating program [BIT_ASSIGN] in the bit assignment unit 115, depending on the magnitude of the encoding difficulty of each picture as measured at step S52 in accordance with the encoding conditions as set at step S51, to effect distribution calculations of the quantity of assigned bits (target quantity).

Using the results of the above-mentioned bit assignment calculations, a provisional encoding is carried out in order to permit the user to judge at step S54, whether or not the ultimate encoding is to be carried out, depending on the picture quality of an output of a local decoder enclosed in the encoder 112. In actuality, the bit stream by the above-mentioned bit assignment is not outputted to the RAID 4 and the picture quality is ascertained in the preview mode in which the user can freely specify a desired processing range.

At step S55, the picture quality is evaluated. If the picture quality is found to be objectionable (NG), processing transfers to step S56 to perform a customizing operation for picture quality adjustment, such as raising the bitrate of the objectionable portion or adjusting the filter level. At the next step S57, bit assignment is re-calculated.

Then, processing reverts to step S54 to make preview of the customized portion. At the next step S55, the picture quality is ascertained. If the picture quality of all portions is good, processing transfers to step S58 to perform ultimate encoding processing (encoding per se) for the entire material by the bit assignment re-calculated at step S57.

If at step S55 the picture quality is found to be unobjectionable, processing directly transfers to step S58 to execute ultimate encoding by the bit assignment calculated at step S53.

At step S59, post-processing, such as writing a bitstream as the result of encoding via small computer system interface (SCSI) in the RAID 104, to terminate the two-path encoding processing.

After execution of the encoding at step S58, the video encoder control unit 116 reports the information on the results of encoding as described above to the supervisor 103 over the network 102.

Meanwhile, the processing of the respective steps excluding steps S52, S54 and S58 is executed off-line.

If, in the above-described sequence of the processing operations, the encoding material cannot be recorded in a sole video tape, it is recorded across plural rolls of tape. Due to the tape exchange operations, encoding cannot be executed continuously.

In the case of a multi-angle portion, the time code of this portion is the same between different angle blocks. Therefore, in this case, continuous encoding again is not possible. The processing unit, which entails transient interruption of the encoding operation, is termed an encoding unit.

The bit allocation calculations in the above-described two-path encoding are hereinafter explained.

First, the total bit quantity [QTY_BYTES] and the maximum bitrate [MAXRATE], of the recording capacity of the package medium storing the encoding results, assigned to the video, are designated from the authoring system. On the other hand, the total number of bits, limited so as to be not larger than the maximum bitrate [USB_BYTES], is found. Then, [SUPPLY_BYTES], as a target value of the total number of targets, is calculated from the total number of frames and a value corresponding to [USB_BYTES] less the number of bits [TOTAL_HEADER] required for [GOP header], is calculated. The quantity of bits assigned to the respective pictures is assigned so as to be not larger than this [SUPPLY_BYTES].

FIG. 4 shows a typical instance of the processing operations for calculating the bit assignment in the step S53 shown in FIG. 3.

At step S61, the total bit quantity [QTY_BYTES] and the maximum bitrate [MAXRATE] sent from the supervisor as described above are entered.

Then, at step S62, the file showing the measured results of the encoding difficulty [Difficulty], prepared at step S52 of FIG. 3, is read.

Then, at step S63, a scene changing point is detected from variations in the parameters such as the dc values of the respective pictures and the magnitudes of the motion vectors ME, measured simultaneously with measurement of the encoding difficulty.

FIG. 5 shows the processing of frames designated for scene changes.

From the variations in the parameters, such as dc values of the respective pictures or magnitudes of the motion vectors, measured simultaneously with measurement of the encoding difficulty, it is possible to detect the scene changing point. This renders it possible to change the P-picture, detected as a scene change, into an I-picture to improve picture quality, as shown in FIG. 5. The number of frames N is herein set to 15 (N=15).

At the next step S64, chapter boundary processing is executed. During chapter search by the disc reproducing device, reproduced pictures jump from non-specified pictures. In order to prevent a reproduced picture from being disturbed eve in such case, the picture type is changed or the GOP length limited by this chapter boundary processing so that the chapter position will always be at the leading position of the GOP.

FIG. 6 shows the processing of the boundary of this chapter-designated frame, that is the cell boundary.

At step S65, the value of the encoding difficulty is interpolated/corrected in meeting with the picture types, such as I-, P- or B-pictures, as modified as a result of the above-described sequence of operations.

This processing is done because the maximum number of displayed fields at the time of decoding of each GOP is limited in the case of a recording medium, such as DVD, and hence it may be an occurrence that the GOP length exceeds the above limitation as a result of the change in the GOP structure accompanying the change in the picture type. In such case, the P-picture is changed to the I-picture to reduce the GOP length in order to meet the limitation by way of GOP limitation.

At the next step S66, the bit quantity is assigned from one encoding unit (ENCU) to another.

Then, at step S67, bit assignment (supply_bytes[encu_nb]) is made from one ENCU to another, depending on the encoding difficulty obtained by the interpolation/correction at step S65 and the number of bits [SUPPLY_BYTES] given to the entire encoding material. This bit assignment is the target value of the sum of the target bits. Then, picture-based bit assignment is executed in dependence upon the target value.

At step S68, the address of the RAID at the time of writing a bitstream as the encoded result is calculated. At step S69, a control file for an encoder is formulated at step S69 to terminate a sequence of the processing operations.

By the above processing, the target number of bits is calculated from one picture to another to formulate a control file for an encoder responsive to the encoding difficulty of the material and the number of bits [SUPPLY_BYTES] accorded to the material in its entirety.

Referring to an instance of bit assignment in case the material contains so-called angle blocks, shown in FIG. 7, the above-described sequence of bit assignment is explained hereinafter in further details. The multi-angle will be explained in detail subsequently.

FIG. 8 shows the basic sequence of bit allocation which takes the weighting coefficients for seamless angle portions into account.

First, at step S71, the total bit quantity [QTY_BYTES] of the recording capacity portion of the package medium assigned to the video is first acquired at step S71 from the supervisor.

Next, at step S72, the total number of bits [USB_BYTES] designated as the encoding condition is found with respect to the total number of bits [QTY_BYTES]:

$$\text{USB\_BYTES}=\min(\text{QTY\_BYTES}, \text{MAXRATE}\times KT\times \text{total\_frame\_number}) \quad (1).$$

If the format of the video material is of the NTSC system or of the PAL system, $KT=\frac{1}{8}$ (bits)/30 Hz and $K=\frac{1}{8}$ (bits)/25 Hz, respectively. Meanwhile, [total_frame_number] is the total number of frames of the materials for encoding and [min(s, t)] is a function which selects a smaller one of s or t.

Then, at step S73, the [USB_BYTES] less the total of the number of bits [TOTAL_HEADER] required for [GOP header] or [ΣTOTAL_SUPPLY_BYTES] is found. The total Σ means the sum for the respective recording layers.

At step S74, [ALL_ANGLE_BYTES] of the seam angle portion is calculated from the total number of frames [TOTAL_FRAMEB]. The reason the bits are first assigned to the seamless angle block is that more strict limitations are placed on the seamless angle block than on other portions so that a larger number of bits are required for the seamless angle block, while the same amount of bits needs to be assigned to equivalent seamless angle block s.

If the number of frames of each encoding unit (ENCU) is [ENCU_frame[encu_nb}], $$\text{supply\_bytes}[\text{encu\_}nb]=(\text{USB\_BYTES}-\text{TOTAL\_HEADER})\times \text{ENCU\_frame}[\text{encu\_}nb]/\text{total\_frame}b \quad (2)$$

$$\text{ALL\_ANGLE\_BYTES}=\Sigma\text{supply\_bytes (seamless angle block)} \quad (3).$$

Since the numbers of frames of the equivalent seamless angle blocks are equal, the corresponding [supply_bytes] are necessarily equivalent.

Then, at step S75, the [supply_bytes] of each ENCU of the portion other than the angle block portion, that is [ALL_SUPPLY_BYTES], are calculated with respect to a value equal to [USB_BYTES] less [ALL_ANGLE_BYTES]. If bit assignment is done based simply on the frame number ratio, optimum bit assignment cannot be achieved in case picture difficulty varies from one ENCU to another. Therefore, the sum total of the encoding difficulty of each ENCU is found and, at step S76, the bit quantity assignment is done at the ratio therebetween.

There are occasions wherein the user is desirous to act consciously on the bit assignment among the ENCUs at the material stage. For example, in inserting commercial ads before a cinema material, it may be desired to raise the bit rate consciously only for this portion. This desideratum may be realized by setting the weighting coefficient [e_weight] for the sum total of the encoding difficulty of each ENCU.

For example, this weighting coefficient may be set by a file shown in the following table 1 and loaded at the time of executing bit calculations:

$$\text{DIFF\_SUM}=\Sigma\text{ENCU\_diff}[\text{encu\_}nb](\text{ENCU portion for other than seamless angle portion}) \quad (4).$$

$$\text{ALL\_SUPPLY\_BYTES}=\textit{USB}\_\text{BYTES}-\text{TOTAL\_HEADER}-\text{ALL\_ANGLE\_BYTES} \quad (5).$$

$$\text{Supply\_bytes}[\text{encu\_}nb]=\textit{ALL}\_\text{SUPPLY\_BYTES}*\text{ENCU\_diff}[\text{encu\_}nb]/\text{DIFF\_SUM} \quad (6).$$

TABLE 1

| ENCU_nb | e_weight |
|---|---|
| 1 | 1.2 |
| 2 | 1.0 |
| 3 | 0.9 |
| 4 | 1.0 |

TABLE 1-continued

| ENCU_nb | e_weight |
|---|---|
| 5 | 1.0 |
| 6 | 1.0 |
| 7 | 1.05 |
| 8 | 1.0 |
| 9 | 1.05 |
| 10 | 1.05 |

In the following explanation, it is assumed that bit quantities are assigned on the GOP basis and subsequently the bits are assigned in each GOP in meeting with the difficulty of each picture [GOP-DIFFICULTY]. The GOP-based quantity of bit assignment at the time of encoding [GOP_target] is assigned in dependence upon the sum of the GOP-based difficulty [GOP_target].

FIG. 9 shows an example of the simplest function for converting the sum of the GOP-based encoding difficulty [gop_diff] and the GOP-based amount of bit assignment [gop_target].

Here, with [gop_target] being Y, [gop_diff] being X and with DIFFICULTY_SUM=ENCU_diff[encu_nb], an evaluation function represented as $$Y=AX+B$$

is used. Also, the sum total of [Difficulty] of all pictures or [ENCU_diff[encu_nb]] is used.

$$B=GOP\_MINBYTES$$

$$\Sigma y = A \times \Sigma x + B \times n$$

where $\Sigma y$=supply_bytes[encu_nb], $\Sigma X$=ENCU_diff[encu_nb] and n is the sum total of the GOPs. Therefore, $$A=\text{supply\_bytes}[encu\_nb]-B \times n)/\text{ENCU\_diff}[encu\_nb].$$

$$GOP\_target = A \times GOP\_diff + B \qquad (8).$$

Then, bit assignment is done in each GOP in meeting with the encoding difficulty of each picture [gen_bit[k]]. This [gen_bit[k]] is a value of the encoding difficulty of a k'th frame as measured by provisional encoding, with the picture difficulty being higher the larger the value of this encoding difficulty [gen_bit[k]]. If bit assignment to each picture in the GOP is rendered proportionate to the value of encoding difficulty, the target quantity in each picture is found by the following equation:

$$target(k)=GOP\_TARGET \times [gen\_bit[k]]/GOP\_diff \qquad (9)$$

where $1 \leq k \leq$ the number of pictures in a GOP.

If, in this case, there is an extremely difficult picture in the material, that is a picture with a large value of [GOP_diff], the quantity of the [gop_target] is drastically increased such that the maximum rate allowed in the system is exceeded. It is therefore necessary to apply a limiter with a fixed quantity [GOP_MAXBYTES]. The minimum target quantity is also limited by [GOP_MINBYTES].

For video encoding by the MPEG, it is mandatory to make bit assignment in consideration of the residual buffer volume of a virtual decoder. The calculations for the residual buffer quantity are termed video buffering verifier (VBV).

The method for calculating the virtual residual buffer quantity is hereinafter explained.

FIG. 10 shows the method for calculating the VBV.

If the recording medium is the so-called DVD, and the start point of a buffer for the k'th picture with the buffer size of [VBV MAX] of 1.75 Mbits is [Occupancy_up(k)], with the target quantity of the k'th picture being [target(k)], the residual buffer quantity [Occupancy_down(k)] after supplying the bits to the picture is represented by the equation (7).

In this buffer is stored the data quantity [SYSTEM_SUPPLY] of a bitrate corresponding to the video data quantity from a decoder pickup. The residual buffer quantity after this supply [Occupancy_up(k+1)] is represented by the equation (8).

The supply amount corresponds to the right upward rising quantity in the drawing. The larger the rate of the bits supplied, the larger becomes the gradient and the larger is the amount of data stored in the buffer. If the buffer is charged to its full capacity, the data supply from the pickup to the buffer ceases. Therefore, buffer overflow need not be taken into consideration. This means that it is unnecessary to perform control to just a pre-set value, it being only sufficient to perform control so that the pre-set value will be surpassed.

Conversely, if the data volume of each picture is large, the data stored in the buffer is decreased. The target bit quantity is calculated so that the residual buffer quantity will not be decreased to below a pre-set value. The first [Occupancy_up(0)] of these calculations is started from a fixed value, herein VBV MAX×⅔.

In the following, [Occupancy_up] and [Occupancy_down] mean upper and lower points of each picture on the graph, respectively.

$$Occupancy\_up(0)=VBV\ MAX \times 2/3 \qquad (10)$$

$$Occupancy\_down(k)=Occupancy\_up(k)-target(k) \qquad (11)$$

$$Occupancy\_up(k+1)=Occupancy\_down(k+1)+SYSTEM\_SUPPLY \qquad (12)$$

$$SYSTEM\_SUPPLY=MAXRATE(bps) \times KT \qquad (13).$$

In the following, there is shown an instance of target bit allocation calculations on the GOP basis.

FIG. 11 shows an instance of target bit assignment in case VBV buffer calculations are made with respect to the target quantity found in consideration of the evaluation function and [GOP_MAXRATE] limitations.

The first, fourth and seventh pictures in FIG. 11 are lower in VBV value than the value of [VBV MIN] which is the lower limit of the VBV buffer. Therefore, the target quantity of the GOP containing the picture whose VBV value is decreased to below [VBV MIN] is diminished.

If the minimum value of [occupancy] when VBV calculations are executed on the target quantity prior to imposing the VBV limitations in the GOP is [Occ_min], the quantity of adjustment is given by $$\gamma=[Occ\_start-VBV\ MIN)/(VBVSTART-Occ\_min)\ \text{for Occupancy\_min}<VBV\ MIN \qquad (14)$$

where the start point for limitation [kstart] has a reference value [VBVLINE] which is the value for k not smaller than VBV MAX X (¾), with the value of [Occupancy_up(k)] being [Occ_start], with $$target(j)=target(j) \times r(kstart \leq j \leq k)$$

for each target.

FIG. 12 shows an instance of target bit assignment following the above-described VBV limitation processing.

The first, fourth and seventh pictures, whose VBV were below [VBV MIN] as the lower limit of the VBV buffer prior to the processing for VBV limitation, are adjusted so that the VBV value will not be lower than this limit value.

By performing the encoding by a control file prepared using the target quantity, thus found, the bit assignment can be achieved in dependence upon the difficulty of the picture as a video material, so that a smaller number of bits can be assigned to a simpler picture while a larger number of bits can be assigned to a more intricate picture, thus realizing variable rate encoding suffering from less variations throughout the performance time.

Meanwhile, the disc format for a digital video disc (DVD) provides a disc having two recording layers on one side and a disc having a sum of four recording layers on its both sides.

How many number of bytes is to be assigned to the video data recorded on each of the respective recording layers is pertinent to the configuration of the entire disc and hence is specified by the supervisor as encoding conditions. When setting these encoding conditions on the part of the supervisor, difference in difficulty of pictures as the video material scheduled to be recorded on the respective recording layers is not known, such that there is no alternative but to distribute the bytes by having reliance simply on the proportions of frames recorded on the respective recording layers.

However, since the pictures of the materials recorded on the respective recording layers undergo variations, there is produced difference in picture quality between the different recording layers if the bytes are uniformly distributed in this manner among the recording layers.

For example, if the performance time for the first layer is equal to that for the second layer, the same number of bytes is specified as the encoding conditions. However, if a large number of simple still pictures are contained in the first layer, while a large number of pictures having a larger information volume are contained in the second layer, there is produced a significant difference in picture quality between the first and second layers, such that alien feeling is invoked if the two layers are switched during playback on a disc reproducing device.

FIGS. 13A and 13B show an instance of bit assignment in accordance with the conventional system on a recording medium such as a so-called DVD having two recording layers.

The encoding units ENCU1 and ENC2 are totally identified in the number of frames and in the sum of encoding difficulty and hence are of the same encoding conditions. However, the bit assignment for the recording layer [Layer 1] differs from that for the recording layer [Layer 2]. If the encoding is done under this condition, there is produced an explicit picture quality difference between the encoding units ENCU1 and ENC2.

FIG. 14 collectively shows the results of bit assignment for the respective encoding units ENCU in the example shown in FIGS. 13A and 13B.

This difference among the different recording layers can be confirmed only by the evaluation of the picture quality following the encoding. Thus, the encoding conditions are changed at a time point when the picture quality is verified to be undesirable. However, it is not known to which extent the encoding conditions can be adjusted, so that the operation is a cut-and-try operation, thus significantly lowering the efficiency.

An instance in which the material for encoding contains a so-called angle block.

The angle reproduction in the digital video disc DVD is the reproduction enabling the user to reproduce a picture of the same object at the same time instant from plural angles, as shown in FIG. 15. The angle reproduction encompasses a non-seamless angle reproduction which allows for transient interruption of a playback picture at the time of switching, such as by black insertion, and seamless angle reproduction in which switching is allowed to occur without disturbance, that is seamlessly. Here, an instance of switching between three pictures from different angles, that is [Angle 1], [Angle 2] and [Angle 3], is shown.

FIG. 16 shows an instance of data containing angle blocks.

In this figure, the encoding units ENC2, ENCU4 and ENCU 5 denote angle combinations. In the case of the seamless angle, the number of pictures and the GOP structure are designed to be the same for the combination of angles, namely ENC2, ENCU4 and ENCU 5.

If the angle is switched during reproduction, the playback pickup of the reproducing device is moved to a position of data at a predetermined angle to start readout of data. For reducing the delay required for angle switching at the time of reproduction, it is necessary for the distance of this movement to be small. The angle block data has the positions on the disc interleaved in terms of M GOPs as a unit, with the value of M being different depending on the encoding conditions.

An instance of this interleaving is shown in FIG. 17.

The operation of interleaving the data from one unit to another is extremely complex if the data quantity to be interleaved differs from one angle to another. If there are many angles, the processing time is exponentially increased.

If bits are assigned so that the amounts of data of the respective angles in the interleaving units are the same at the state of output data following the encoding, as shown in FIG. 17A, it is unnecessary to insert stuffing dummy data shown in FIG. 17B, thus increasing the video rate at the angle positions. Thus, as shown in FIG. 17C, the same target quantity is assigned to each associated GOP at the time of bit assignment for the respective angle portions. Thus, it is desirable to assign the same bit quantity to the same seamless angle block.

FIG. 18 shows a processing example of the above-described seamless angle block.

For seamless reproduction on the side of the reproducing device, it suffices if control is performed so that the value of the residual buffer quantity of the VBV of the picture of the next start point will be larger than a predetermined value, such as VBV MAX*⅔.

FIG. 19A shows an example of encoding in which limitations are placed on the residual VBV buffer quantity, while FIG. 19B shows the residual buffer quantity when the encoding results are reproduced by a decoder (reproducing device).

In this manner, the residual buffer quantity in the decoder is necessarily larger than the calculated VBV value at the time of encoding. If, in the decoder, the buffer is full, there ceases the supply from the pickup to the buffer, so that there is no necessity of taking buffer overflow into consideration. Therefore, since there is no risk of buffer failure at the time of switching, seamless switching is assured if limitations are imposed in this manner at the time of encoding.

Also, since GOP-based switching is presupposed in the seamless angle, the first and the last VBV values of all GOPs are controlled to be not less than pre-set values, as shown in FIG. 20.

Since there are many limitations in the seamless angle block compared to the routine blocks, it is difficult to realize equivalent picture quality if the same bitrate is assigned. It is therefore desirable to assign bits preferentially to the seamless angle block.

However, if closed bit assignment is executed from one recording layer to another for video data containing seamless angle blocks, and which are recorded on plural recording layers, such as DVDs, there are occasions wherein a sufficient bitrate is not assigned to seamless angle blocks in certain recording layer(s). If sufficient picture quality is not realized after encoding, it becomes necessary to change the conditions and to perform the encoding operations from the outset.

In the encoding operation for preparing a disc of a package medium, such as DVD, the operations for respective parts, such as audio, video, subtitle or menu, are executed in parallel. Therefore, if it becomes necessary to correct the video encoding conditions, the encoding process other than the video encoding process, such as that for audio, for example, is affected by such correction. Thus, the encoding process other than the video encoding process needs to be performed again from the outset. That is, delay in judgment as to appropriateness of bit assignment leads to a large number of wasteful steps accompanying the re-encoding operations.

SUMMARY OF THE INVENTION

It is therefore an object of the present invention to provide a two-path encoding method and apparatus having a function such that, in assigning bits to compressed video data recorded on plural recording layers, it is evaluated whether or not bit assignment can be achieved so that no significant difference occurs in the picture quality between respective recording areas under given encoding conditions and, if the picture quality is not up to given encoding conditions, contents of change of encoding conditions providing an optimum or allowable variation quantity can be presented to an operator.

In one aspect, the present invention provides an encoding method for encoding a video material for recording in a plurality of recording areas, including a preliminary encoding step prior to ultimate encoding, an evaluation step for evaluating bit assignment as to allowability of the difference in picture quality between different recording areas under given encoding conditions and a presentation step for presenting an optimum range of bit assignment for which the picture quality difference between the different recording areas is allowable. The ultimate encoding is executed under the given encoding conditions or by the bit assignment of the presented optimum range.

In another aspect, the present invention provides an encoding method for encoding a material in which seamless angle blocks are contained in a plurality of recording areas, including a step of finding an average rate of the encoding difficulty from the sum of the number of bytes and the total number of frames, of each of which an upper limit accorded from one recording area to another is taken into account, a step of securing, from each recording area, the number of bytes assigned to the seamless angle block to be recorded in each recording area in accordance with the ratio of the number of frames which takes a weighting coefficient into account, and a step of assigning the residual number of bytes, obtained after deduction of the number of bytes assigned to the seamless angle blocks, in proportions of the sum of the encoding difficulty in which weighting coefficients are considered for blocks other than the seamless angle blocks.

In still another aspect, the present invention provides an encoding apparatus for encoding a video material for recording in a plurality of recording areas, including preliminary encoding means for doing preliminary encoding prior to ultimate encoding, evaluation means for evaluating bit assignment as to allowability of the difference in picture quality between different recording areas under given encoding conditions and presentation means for presenting an optimum range of bit assignment for which the picture quality difference between the different recording areas is allowable. The ultimate encoding is executed under the given encoding conditions or by the bit assignment of the presented optimum range.

In yet another aspect, the present invention provides an encoding method for encoding a material in which seamless angle blocks are contained in a plurality of recording areas thereof, including a step of finding an average rate of the encoded material from the sum of the number of bytes and the total number of frames, an upper limit of each of which accorded from one recording area to another is taken into account, a step of securing, from each recording area, the number of bytes assigned to the seamless angle block to be recorded in each recording area in accordance with the ratio of the number of frames which takes a weighting coefficient into account and a step of assigning the residual number of bytes, obtained on deduction of the number of bytes assigned to the seamless angle blocks, to blocks other than the seamless angle blocks in proportions of the sum of the encoding difficulty which takes a weighting coefficient into account.

In the above-described encoding method and apparatus of the present invention, if bit assignment is done for compressed video data recorded in plural recording areas, the difference in the picture quality between plural recording areas is hardly produced such that encoding conditions can be reconsidered or changed at an earlier time.

According to the present invention, the quantity of picture quality variation across plural recording layers or areas under the encoding conditions accorded by the supervisor prior to execution of the ultimate encoding can be predicted and evaluated so that the supervisor can be prompted to reconsider the conditions at an earlier time point and hence the number of encoding steps for disc formulation of the package medium such as DVD can be reduced.

BRIEF DESCRIPTION OF THE DRAWINGS

FIG. 9 illustrates certain simplest functions for converting the sum of the encoding GOP-based difficulty [gop_diff] and the quantity of GOP-based bit assignment at the time of encoding [gop_target].

FIGS. 13A, 13B show typical bit assignment for a recording medium having two recording layers.

FIG. 14 shows typical bit assignment for a recording medium having two recording layers by a conventional system.

FIG. 24 collectively shows the results of bit assignment for the respective encoding units in the case of FIGS. 23A and 23B.

FIG. 26 collectively shows the results of bit assignment to respective encoding units ENCUs in the case of FIGS. 25A and 25B.

FIGS. 35A and 35B show an instance of correction to a proper range for bit re-assignment.

FIG. 36 illustrates an instance of correction to a proper range for bit re-assignment.

FIG. 38 illustrates an instance of correction to a proper range for bit re-assignment.

DESCRIPTION OF THE PREFERRED EMBODIMENTS

Figure 1:
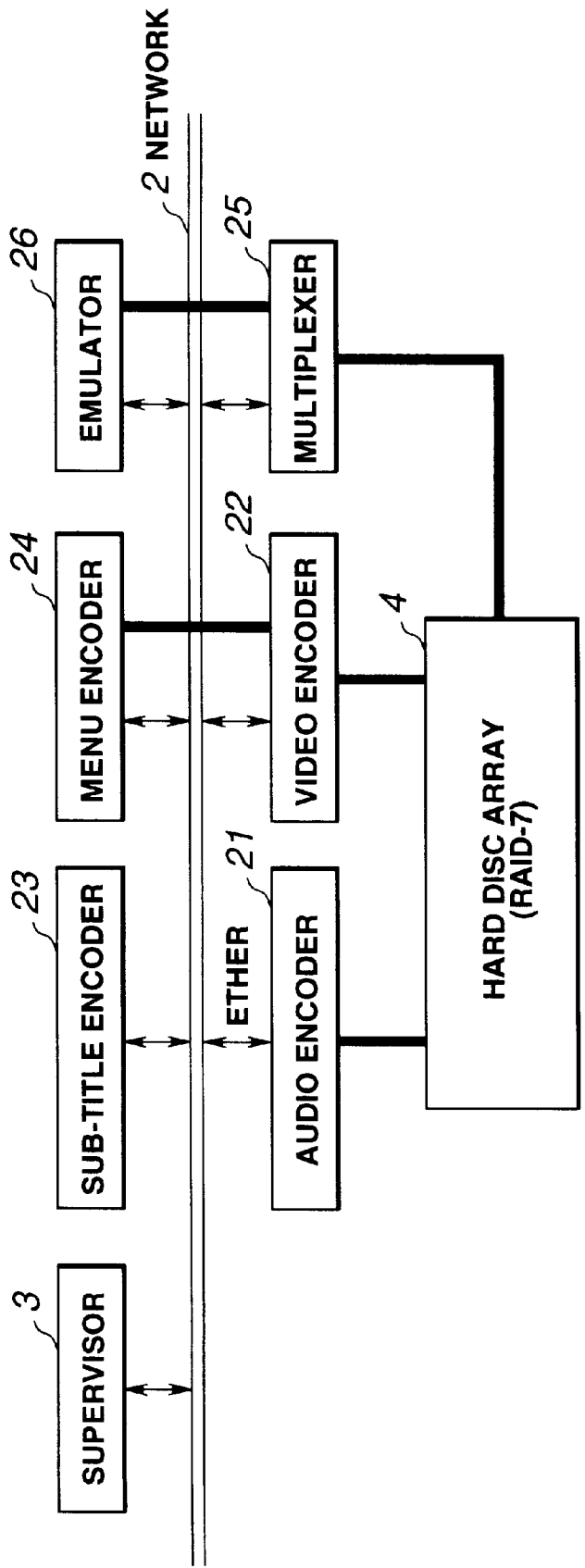
FIG. 1 shows a configuration of an encoding device.

Referring to the drawings, preferred embodiments of the present invention will be explained in detail.

Before proceeding to description of the present invention, the terms used for the following description are elucidated.

encu_max: number of ENCUs;

layer_max: number of recording layers;

angle_num_max: number of angles contained in an angle block;

angle_block_max: number of angle blocks;

gen_bit[k]: value of the encoding difficulty (Difficulty) of a k'th frame as measured by provisional encoding; the larger the value, the more intricate is a picture in question.

ENCU_mode [encu_nb]: information specifying whether or not the ENCU under consideration is a seamless angle; this information being [1] and [0] if the ENCU is a seamless angle and if otherwise respectively.

ENCU_angle [encu_nb]: information specifying to which angle block belongs the seamless angle block under consideration; this information being [0] if the ENCU is not the seamless angle.

ENCU_weight [encu_nb]: weighting coefficient of the seamless angle block under consideration at the time of bit assignment;

ANGLE_weight [angle_blk]: weighting coefficient of the seamless angle block under consideration at the time of bit assignment which, for equating the weight in the same angle block at the time of bit assignment, is an average value of [ENCU_weight] in the same angle block. The average value is used in the present example although it may be replaced by a maximum value or a minimum value.

ANGLE_weight[ENCU_angle[encu_nb]]: =(sum of ENCU_weight of ENCUs having the same value of ENCU_angle)/angle_num    (15).

ENCU_diff [encu_nb]: encoding difficulty of an ENCU under consideration; being the sum of (gen_bit[k])× ENCU_weight [encu_nb].

ENCU_frame [encu_nb]: sum of the number of frames of the ENCU under consideration;

ENCU_layer [encu_nb]: information indicating to which recording layer belongs the ENCU under consideration; 0≦ENCU_layer [encu_nb]≦layer_max;

QTY_BYTES [layer_nb]: the number of usable bytes of the recording layer under consideration, as designated by a supervisor;

USB_BYTES [layer_nb]: the number of usable bytes of the recording layer under consideration, in case an upper limit value in the recording layer under consideration is taken into consideration;

QTY_change [layer_nb]: information specifying whether or not ⌈QTY_BYTES⌋ has exceeded an upper limit value; this information being ⌈1⌋ and ⌈0⌋ if change has been made and if otherwise, respectively;

TOTAL_HEADER [layer_nb]: total number of bytes of a GOP header of the recording layer under consideration;

TOTAL_FRAME [layer_nb]: total number of frames of the recording layer under consideration;

SUM_DIFF [layer_nb]: sum of encoding difficulty multiplied by a weighting coefficient of the recording layer under consideration other than the seamless angle;

For encu_nb satisfying (ENCU_mode [encu_nb]==layer_nb and ENCU_mode [encu_nb]==0, $$SUM\_DIFF[layer\_nb] = \Sigma ENCU\_diff[encu\_nb] \quad (16).$$

It is noted that ⌈=⌋ means substitution, whereas ⌈==⌋ means condition verification as to possible equality in the same manner as in C language etc.

ANGLE_WFRAME [layer_nb]: quantity of total frames of only the seamless angle of the recording layer under consideration reflecting the weighting coefficient;

For ⌈encu_nb⌋ satisfying (ENCU_mode [layer_nb]==layer_nb and ENCU_mode [encu_nb]>0), $$ANGLE\_WFRAME[layer\_nb] = \Sigma ENCU\_frame[encu\_nb] \times ANGLE\_weight[ENCU\_angle[encu\_nb]]) \quad (17).$$

SUM_WFRAME: total quantity of frames reflecting the weighting coefficient of the seamless angle;

$$SUM\_WFRAME = \Sigma ENCU\_frame[encu\_nb] + \Sigma ANGLE\_WFRAME [layer\_nb], \text{ provided that } encu\_nb \text{ satisfies } ENCU\_mode == 0 \quad (18).$$

CHECK_USB_[layer_nb]: proper value of the number of usable bytes in the recording layer under consideration;

CHECK_SUPPLY [layer_nb]: proper value of the number of usable bytes in the portion of the recording layer under consideration other than the seamless angle;

CHECK_DIFF [layer_nb]: proper value of the number of usable bytes in the portion of the recording layer under consideration other than the seamless angle;

CHECK_FRAME [layer_nb]: proper value of the total number of frames in the portion of the recording layer under consideration other than the seamless angle;

supply_bytes [encu_nb]: number of bytes assigned to the ENCU under consideration.

First, taking an example of bit assignment for compressed video data recorded on plural recording layers of a recording medium, such as DVD, as a recording medium having plural recording areas, the bit assignment method for each encoding unit ENCU in the encoding method according to an embodiment of the present invention, will be explained.

In the encoding method according to the present invention, the conventional system is expanded so that ⌈QTY_BYTES⌋ is supervised on the recording layer basis.

If the maximum number of bytes of each recording layer is $$MAXBYTES = MAXRATE \times KT \times total\_frameb[layer\_nb] \quad (19)$$

then the following equations hold:

$$USB\_BYTES[layer\_nb] = \min(QTY\_BYTES[layer\_nb], MAXBYTES) \text{ where } (0 \leq layer\_nb \leq \text{number of recording layers}[layer\_max]) \quad (20)$$

$$TOTAL\_SUPPLY\_BYTES[layer\_nb] = \Sigma USB\_BYTES[layer\_nb] - \Sigma TOTAL\_HEADER[layer\_nb] \quad (21)$$

$$ALL\_ANGLE\_BYTES[layer\_nb] = ANGLE\_WFRAME\_frame[layer\_nb]/SUM\_WFRAME \times \Sigma TOTAL\_SUPPLY\_BYTES[layer\_nb] \quad (22)$$

$$ALL\_SUPPLY\_BYTES[layer\_nb] = USB\_BYTES[layer\_nb] - ALL\_ANGLE\_BYTES[layer\_nb] \quad (23).$$

Since the quantity of bit assignment to corresponding blocks in the seamless angle block needs to be of a substantially equal value, bit assignment to each encoding unit ENCU to the recording layer indicated by ⌈layer_nb⌋ needs to be different for seamless angle portions and other portions.

That is, bit assignment in the conventional system is done on the basis of the ratio of the seamless angle frames, it is done in the system embodying the present invention on ⌈TOTAL_SUPPLY_BYTES⌋ of all recording layers by a ratio of the numbers of frames in which the weighting coefficient is taken into account.

By so doing, the seamless angle block rate can be equated for the totality of the recording layers. Moreover, an operator can consciously perform control by varying the weighting coefficient.

(1) Bit assignment to the ENCU of the seamless angle block

For ⌈encu_nb⌋ satisfying (ENCU_layer [encu_nb]==layer_nb and ENCU_angle [encu_nb]==1, $$supply\_bytes[encu\_nb] \times ANGLE\_weight[ENCU\_angle[encu\_nb]]) /ANGLE\_WFRAME[layer\_nb] \times ALL\_ANGLE\_BYTES[layer\_nb] \quad (24).$$

(2) Bit Assignment to Portions of the ENCU Other than the Seamless Angle Block

For ⌈encu_nb⌋ satisfying (ENCU_layer [encu_nb]==layer_nb and ENCU_angle [layer_nb]==0, $$supply\_bytes[encu\_nb] = ENCU\_diff[encu\_nb]/SUM\_DIFF[layer\_nb] \times ALL\_SUPPLY\_BYTES[layer\_nb] \quad (25).$$

A specified embodiment of the present invention is hereinafter explained. In the following explanation, it is assumed that Gr_min_limit=0.9

Gr_max_limit=1.1 and that, for simplicity,

ENCU_weight [encu_nb]=1.0.

Figure 21:
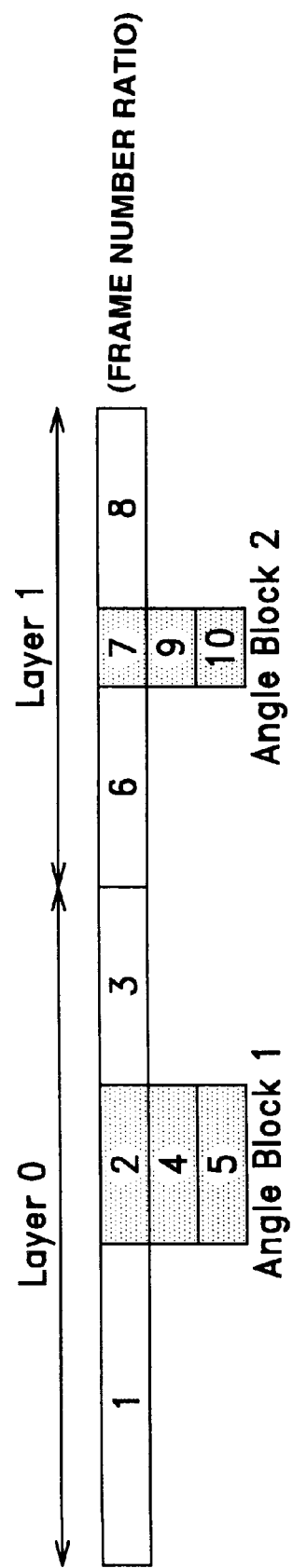
FIG. 21 illustrates the manner of bit assignment in proportion to the ratio of the numbers of frames to seamless angle block containing data recorded on two recording layers.

FIG. 21 shows an example of doing bit assignment, in dependence upon the ratio of the numbers of frames, on respective seamless angle block containing compressed video data recorded on two recording layers ⌈Layer 0⌋ and ⌈Layer 1⌋ of a recording medium, such as so-called DVD.

It is noted that ENCU (encoding unit) 2, ENCU 4, ENCU 5 of the ⌈Layer 0⌋ and ENCU7, ENCU 9, ENCU 10 of the ⌈Layer 0⌋ are angle blocks 1 and 2 each composed of seamless angles.

Figure 22:
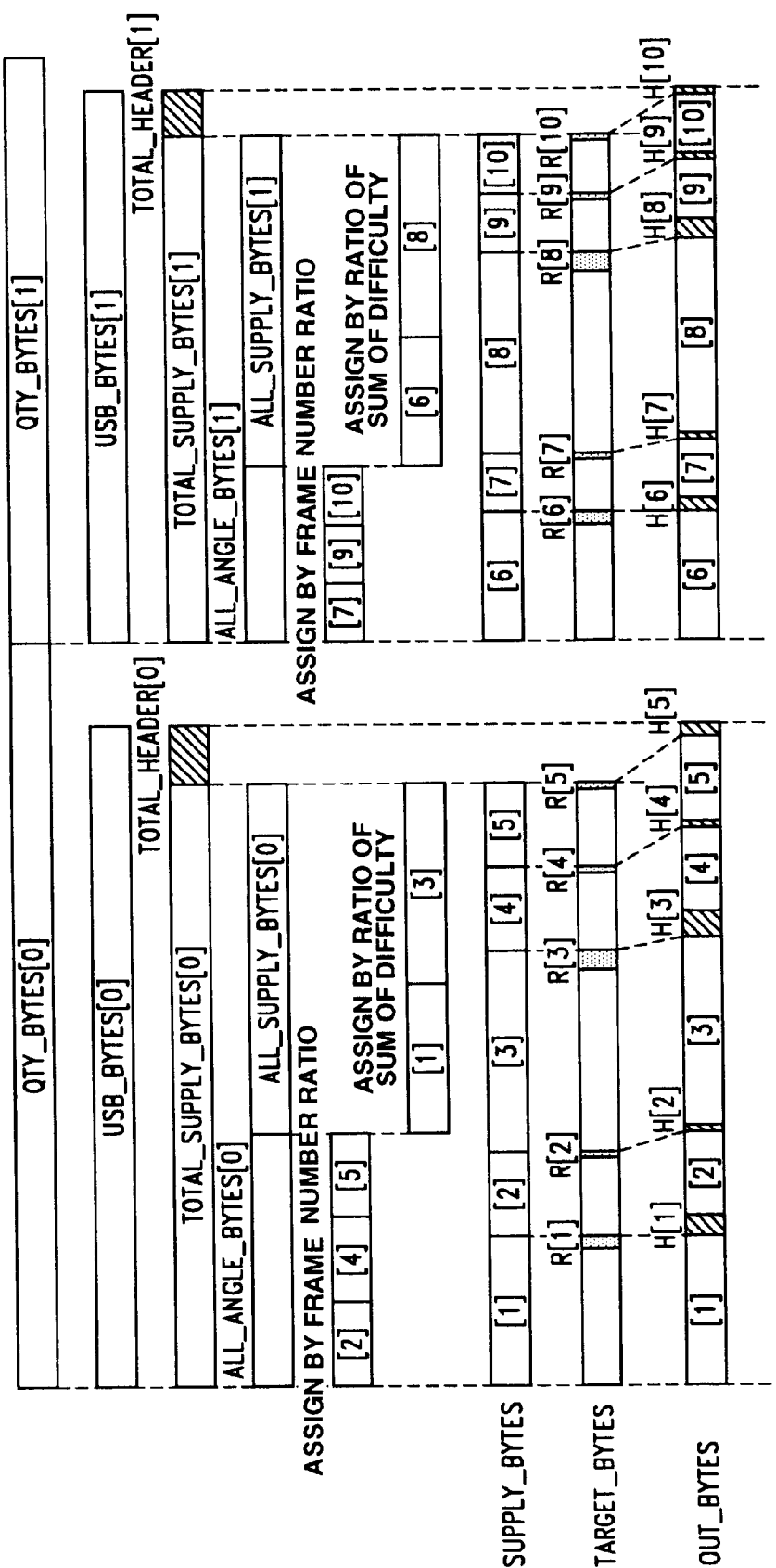
FIG. 22 shows details of the bit assignment.

FIG. 22 shows a specified embodiment of bit assignment for compressed video data recorded on a recording medium having two recording layers, as exemplified in FIG. 21.

Specifically, the ⌈QTY_BYTES[0]⌋ and ⌈QTY_BYTES[1]⌋, which represent data quantities obtained on subtracting data quantities such as audio data or subtitle data from the encoding material from the recording capacity of the recording medium, are sent from the supervisor.

There are occasions wherein ⌈QTY_BYTES[0]⌋ and ⌈QTY_BYTES[1]⌋ are not in meeting with the conditions such as maximum rate limitation or VBV limitations as provided in the DVD format. Therefore, these [QTY_BYTES[0]] and [QTY_BYTES[1]] are rate-limited to satisfy these limitation to [USB_BYTES[0]] and [USB_BYTES[1]], respectively.

The data quantities, obtained on subtracting the header areas [TOTAL_HEADER[0]] and [TOTAL_HEADER[1]] of the [USB_BYTES[0]] and [USB_BYTES[1]], serve as [TOTAL_SUPPLY_BYTES [0]] and [TOTAL_SUPPLY_BYTES [1]], respectively.

It is noted that the [TOTAL_SUPPLY_BYTES [0]] and [TOTAL_SUPPLY_BYTES [1]] are assigned to the angle portions and non-angle portions of the respective recording layers by the ratio of the number of frames and by the ratio of the sum of the encoding difficulty, respectively.

Specifically, the [TOTAL_SUPPLY_BYTES [0]] and [TOTAL_SUPPLY_BYTES [1]] are assigned to the ENCU2, ENCU4 and ENCU5 of the [Layer 0] by the ratio of the numbers of frames, while being assigned to the ENCU2, ENCU4 and ENCU5 of the [Layer 0] by the ratio of the sum of the encoding difficulty (Difficulty). The so-assigned bits serve as [SUPPLY_BYTES].

FIGS. 23 and 24 show examples of bit assignment by the conventional system for comparison sake. Referring to this conventional system, the bit assignment system of the present invention is hereinafter further explained.

FIG. 23 shows how bits are assigned to seamless angle containing data recorded on the two recording layers [Layer 0] and [Layer 1] of the recording medium such as DVD in dependence upon the ratio of the numbers of frames.

Figures 23A, 23B:
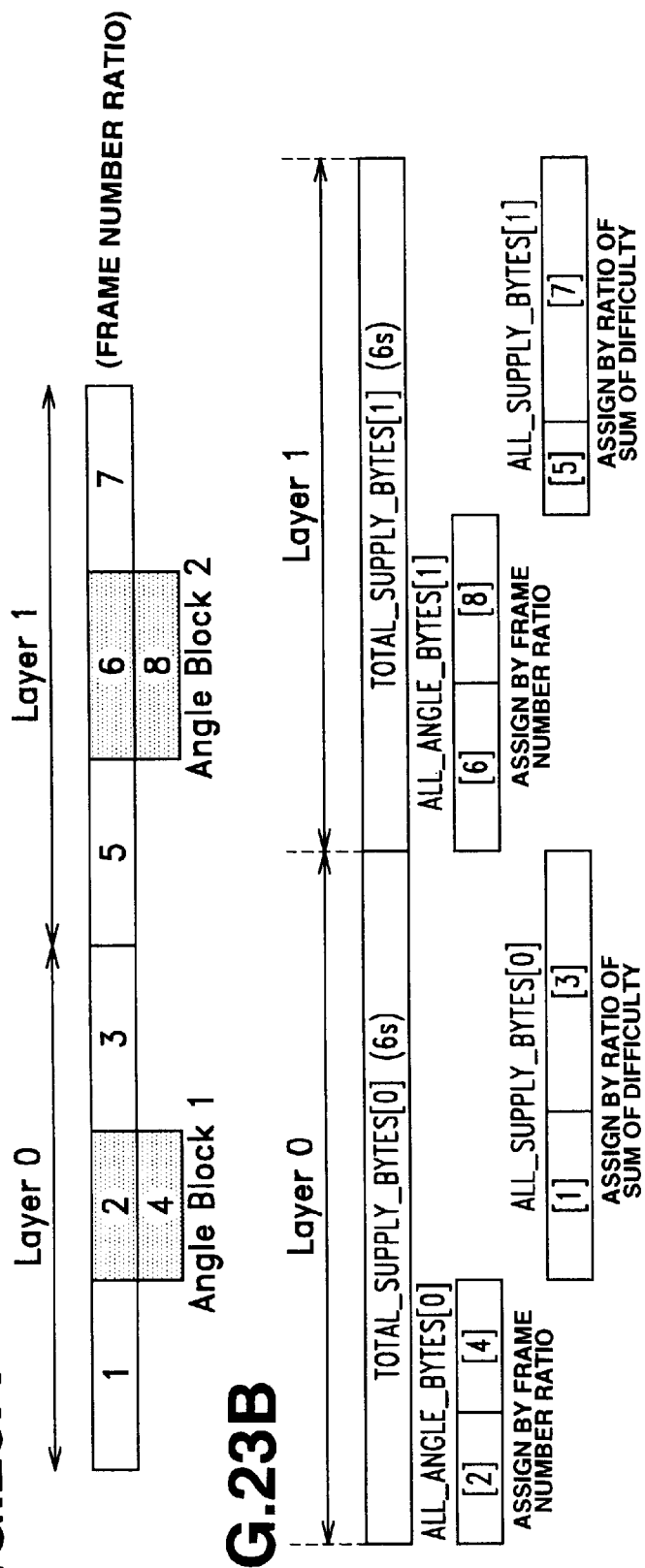
FIGS. 23A and 23B illustrate the manner of bit assignment to seamless angle block containing data recorded on two recording layers by a conventional system.

In FIG. 23A, the ENCU2 and ENCU4 of the [Layer 0] and ENCU6 and ENCU8 of the [Layer 1] are angle blocks 1 and 2, each made up of seamless angles, respectively.

Referring to FIG. 23B, the data quantities, from which are subtracted the header areas [TOTAL_HEADER[0]] and [TOTAL_HEADER[1]] for each recording layer, serve as [TOTAL_SUPPLY_BYTES [0]] and [TOTAL_SUPPLY_BYTES [1]], respectively.

It is noted that [TOTAL_SUPPLY_BYTES [0]] and [TOTAL_SUPPLY_BYTES [1]] are assigned by the ratio of the numbers of frames and by the ratio of the encoding difficulty (Difficulty) for the angle portions and for the non-angle portions of the respective recording layers, respectively.

For simplicity of explanation, TOTAL_HEADER=0.

FIG. 24 collectively shows the results of bit assignment for the respective encoding units (ENCU) in the embodiment of FIG. 24.

It is seen that, in the present embodiment, the rate of the angle block 2 is insufficient for that of the angle block 1. Since encoding limitations are that severe in the seamless angle block in the bit assignment of the conventional system, it is a frequent occurrence that a low rate leads to non-optimum picture quality.

The bit assignment system embodying the present invention, proposed for solving the above inconvenience, is hereinafter explained.

FIG. 25 shows how bits are assigned, in dependence upon the ratio of the numbers of frames, on seamless angle containing compressed video data recorded on the two recording layers [Layer 0] and [Layer 0] of the DVD, in accordance with the system embodying the present invention.

Figures 25A, 25B:
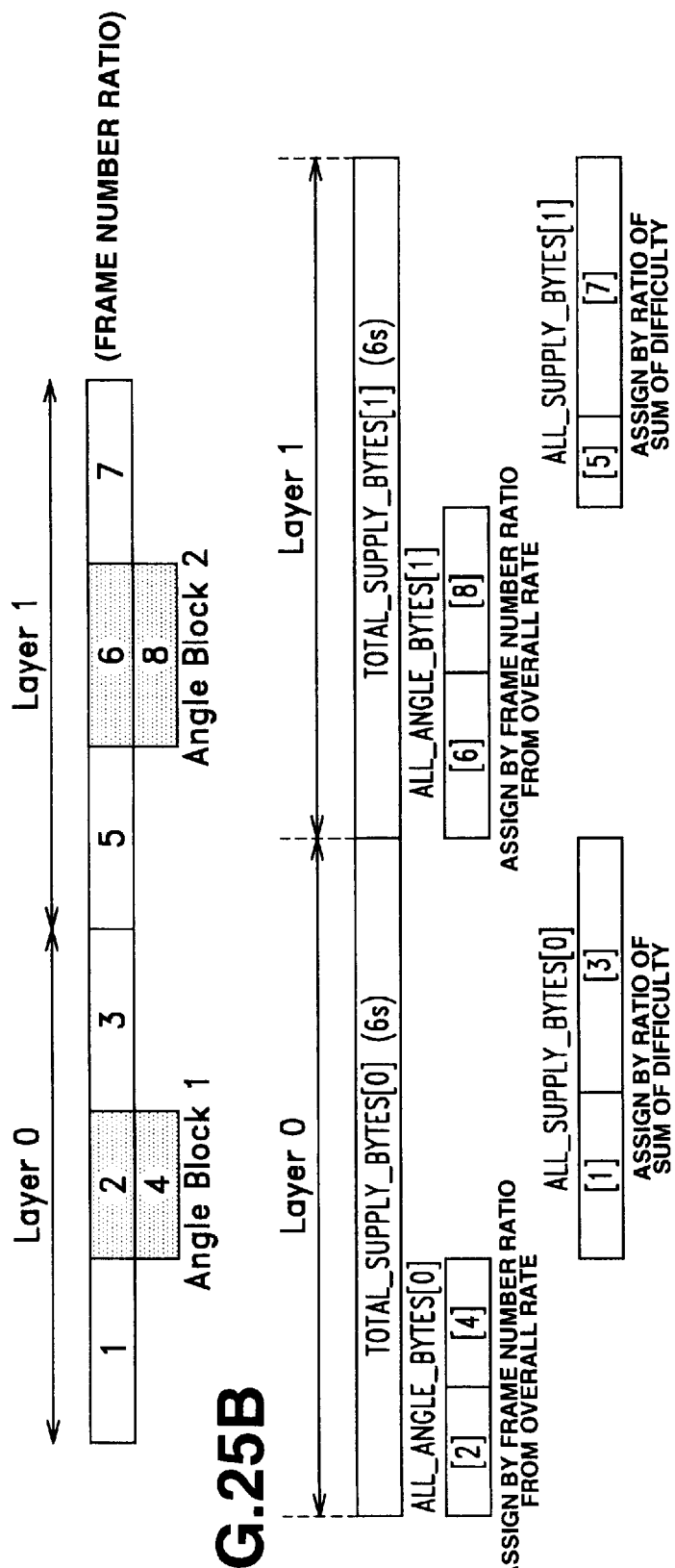
FIGS. 25A and 25B illustrate the manner of bit assignment to seamless angle block containing data recorded in two recording areas.

In FIG. 25A, the encoding units ENCU2 and ENCU4 of the [Layer 0] and ENCU6 and ENCU8 of the [Layer 1] are angle blocks 1 and 2 each made up of seamless angles similar to those of FIG. 23A.

Referring to FIG. 25B, the data quantities resulting from subtraction from the respective layers of the header areas [TOTAL_HEADER [0]] and [TOTAL_HEADER [1]] serve as [TOTAL_SUPPLY_BYTES [0]] and [TOTAL_SUPPLY_BYTES [1]], respectively.

In the bit assignment system of the present embodiment, the [TOTAL_SUPPLY_BYTES [0]] and [TOTAL_SUPPLY_BYTES [1]] are initially assigned for the angle portions of the respective recording layers by the ratio of the numbers of frames from the overall rate and then assigned for the non-angle portions thereof by the ratio of the encoding difficulty (Difficulty).

For simplicity of explanation, TOTAL_HEADER=0.

FIG. 26 collectively shows the results of bit assignment for the respective encoding units (ENCU) in the embodiment of FIG. 25.

If bit assignment is done for the plural recording layers by the above method, it may be an occurrence that the bit quantities assigned in dependence upon the encoding difficulty undergoes variations. In the examples of bit assignment shown in FIGS. 25 and 26, the rate of the ENCU 3 differs significantly from that of the ENCU 7 in the re-adjustment stage.

This phenomenon occurs if the [QTY_BYTES] given by the supervisor is not proper. When the supervisor sets the encoding conditions, the information concerning the encoding difficulty (Difficulty) of the material picture is as yet not available, so that optimum encoding conditions cannot be issued.

In this situation, the video encoder system calculates the variation in the bit assignment between the different recording layers and, if a pre-set threshold value is exceeded, an alarm is issued to prompt the re-issuance of the encoding conditions.

Figure 27:
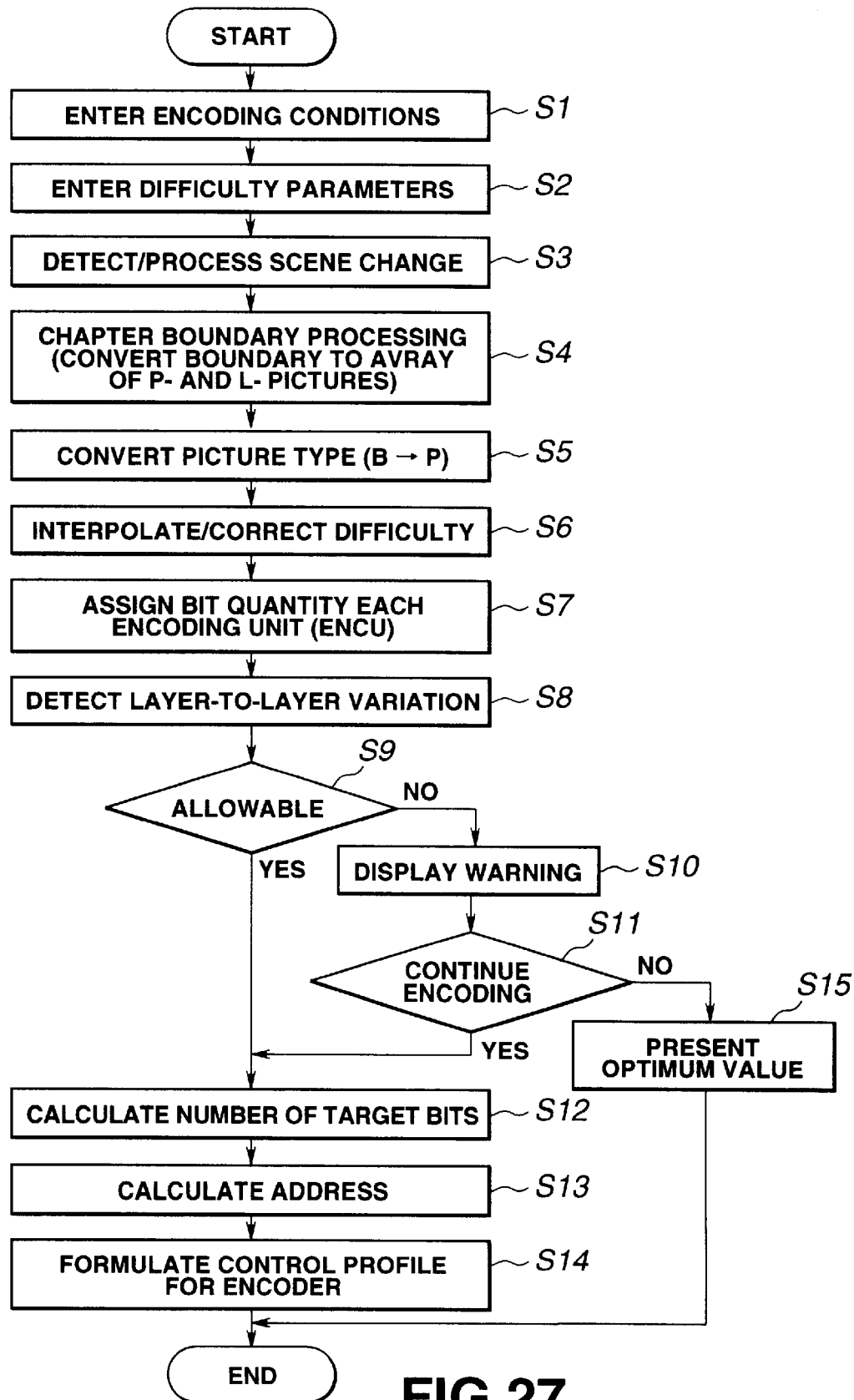
FIG. 27 is a flowchart showing the basic sequence of bit assignment calculations in an embodiment of the present invention.

FIG. 27 shows the basic sequence of the bit assignment calculations according to an embodiment of the present invention.

First, at step S1, the encoding conditions are entered. At step S2, the encoding difficulty (Difficulty) parameters are entered.

Then, at step S3, a scene changing point is detected from the variation of parameters of the magnitude of the dc values or the quantities of the motion vectors of the respective pictures measured with the encoding difficulty in order to perform the processing for changing the picture type such as for improving the picture quality.

Then, at step S4, chapter boundary processing is executed. For chapter search in the reproducing device, picture to be reproduced jumps from an unspecified picture. For preventing the playback picture from being disturbed even in such case, the picture type is changed or the GOP length limited at step S5 so that the chapter position will be necessarily at the leading end of the GOP, by this chapter boundary processing.

Then, at step S6, the value of the encoding difficulty (Difficulty) is interpolated/corrected, in keeping with the picture type, such as I-, P- or B-picture, modified as a result of the above-described series of operations.

Then, at step S7, bit assignment is done for one encoding unit ENCU to another, in dependence upon the encoding difficulty obtained by the interpolation/correction processing at step S6 and the number of bits [SUPPLY_BYTES] accorded to the entire encoding material.

At step S8, the variation of the bit assignment among the respective recording layers is detected.

At step S9, it is evaluated whether or not the variation in the bit assignment among the respective recording layers, as detected at step S8, is allowable. If the variation is found to be unallowable (NO), warming is displayed at step S10 and, at step S11, the operator judges whether or not encoding is to be continued. If, at step S11, it is determined that the processing should be continued, processing transfers to step S12. If the variation among the respective recording layers, evaluated at step S8, is found at step S9 to be allowable (YES), processing transfers directly to step S12.

If it is determined at step S11 not to continue the encoding, optimum values of the conditions, such as bit assignment, are presented to the operator to terminate the processing. In this case, the encoding conditions entered at step S1, are re-considered to evaluate whether or not the encoding conditions are acceptable.

At step S12, the number of the target bits for each picture is calculated, in dependence upon the encoding difficulty obtained by the interpolation/correction at step S6, and the number of bits [SUPPLY_BYTES] accorded to the entire encoding material.

At the next step S13, addresses of the recording medium for recording the results of encoding are calculated.

At the next step S14, the control file for an encoder is formulated to complete the processing for calculating the bit assignment. The encoding per se, that is the ultimate encoding, is executed in accordance with this control file.

The algorithm for calculating the variation in the bit assignment among the respective recording layers is hereinafter explained.

The variation in the bit quantities assigned to the respective recording layers of the recording medium, such as DVD, is evaluated depending on whether the values of the respective recording layers are within prescribed values relative to the ratio [Gr_avr] of the quantity of bit assignment for the portions other than the seamless angle blocks to the sum of the encoding difficulty (Difficulty).

If the values of the respective recording layers are outside the above prescribed range, an optimum range of the numbers of bytes assigned in case the numbers of frames recorded on the respective recording layers are left intact is calculated. It is noted that the number of bytes is already changed from [QTY_BYTES] to [FUSB_BYTES].

On the other hand, an optimum range of the numbers of frames recorded in the respective recording layers in case the quantity of bit assignment to the respective recording layers of the recording medium such as DVD is calculated. This is tantamount to shifting the boundary of recording the material.

The calculations for bit assignment in the encoding method of the above-described embodiment of the present invention are hereinafter explained in further detail.

In the following description, calculations of the optimum values of the numbers of frames or bytes in the case of the plural layers are executed sequentially beginning from the first recording layer.

[STEP 1] calculations of [Gr_avr]

$$Gr\_avr = \Sigma ALL\_SUPPLY\_BYTES\ [layer\_nb]/\Sigma SUM\_DIFF\ [layer\_nb] \text{ where } 0 \leq layer\_nb \leq layer\_max \quad (26).$$

[STEP 2] initializing a presentation loop of a [USB_BYTES] adjustment range under the fixed number of frames conditions $$CHECK\_USB\_[layer\_nb]=USER\_BYTES\ [layer\_nb] \quad (27)$$

$$CHECK\_SUPPLY\_[layer\_nb]=ALL\_SUPPLY\_BYTES\ [layer\_nb] \quad (28)$$

$$CHECK\_DIFF\ [layer\_nb]=SUM\_DIFF\ [layer\_nb] \text{ where } 0 \leq layer\_nb \leq layer\_max\ layer\_nb=0 \quad (29)$$

[STEP 3] calculations of [Gr_check]

$$gr[layer\_nb]=CHECK\_SUPPLY[layer\_nb]/SUM\_DIFF[layer\_nb] \quad (30)$$

$$GR[layer\_nb]=gr[layer\_nb]/Gr\_avr \quad (31)$$

(1) If $GR\_min\_limit \leq GR\ [layer\_nb] \leq Gr\_max\_limit$
  the variation of the picture quality of this recording layer is in an allowable range.
  Gcheck [layer_nb]=0.
(2) If $GR\ [layer\_nb] < Gr\_min\_limit$
  the CHECK_SUPPLY [layer_nb] is in shortage with respect to the CHECK_DIFF [layer_nb].
  Gcheck [layer_nb]=1.
(3) if $Gr\_max\_limit < GR\ [layer\_nb]$
  the CHECK_SUPPLY [layer_nb] is abundant with respect to CHECK_DIFF [layer_nb].
  Gcheck [layer_nb]=2

[STEP 4] presentation of an adjustment range

The limitations on the maximum number of bytes of the [USB_BYTES] should not be exceeded following adjustment of [USB_BYTES]. Also, for a recording layer on which limitations on the maximum number of bytes are already imposed, an increase in [USB_BYTES] is not allowed.

There is presented an adjustment quantity of [USB_BYTES] of the recording layer of [layer_nb] satisfying the conditions $$QTY\_change[layer\_nb]==0 \text{ and } QTY\_change[layer\_nb+1]==0 \text{ and } Gcheck[layer\_nb]==1 \text{ or } 2$$

or $$QTY\_change[layer\_nb]==1 \text{ and } QTY\_change[layer\_nb+1]==2 \text{ and } Gcheck[layer\_nb]==2$$

or $$QTY\_change[layer\_nb]==0 \text{ and } QTY\_change[layer\_nb+1]==1 \text{ and } Gcheck[layer\_nb]==1 \quad (33).$$

$$MAXBYTES=MAXRATE=MAXRATE \times KT \times total\_framenb\ [layer\_nb] \quad (34)$$

$$Gr\_mini\_limit \times Gr\_avr \times CHECK\_DIFF[layer\_nb] \leq CHRCK\_SUPPLY[layer\_nb]$$

and $$CHRCK\_SUPPLY[layer\_nb] \leq \min(Gr\_max\_limit \times Gr\_avr \times CHECK\_DIFF[layer\_nb],\ MAXBYTES-ALL\_ANGLE\_BYTES[layer\_nb]) \quad (35).$$

If $$CHRCK\_SUPPLY[layer\_nb]=Gr\_avr \times CHECK\_DIFF[layer\_nb],$$

[CHECK_SUPPLY] of the next [layer_nb] is corrected to CHRCK_SUPPLY[layer_nb+1]

$$=\min(CHRCK\_SUPPLY[layer\_nb]+CHRCK\_SUPPLY[layer\_nb+1]-CHRCK\_SUPPLY[layer\_nb], MAXBYTES-ALL\_ANGLE\_BYTES\ [layer\_nb+1]) \quad (36).$$

$$CHECK\_USB[layer\_nb]=CHECK\_SUPPLY[layer\_nb]+ALL\_ANGLE\_BYTES[layer\_nb]+TOTAL\_HEADER\ [layer\_nb] \quad (37)$$

$$CHECK\_USB[layer\_nb+1]=CHECK\_SUPPLY[layer\_nb+1]+ALL\_ANGLE\_BYTES[layer\_nb+1]+TOTAL\_HEADER\ [layer\_nb+1] \quad (38).$$

[STEP 5]

layer_nb=layer_nb+1 is set and, if [layer_nb] is not of the same value as ⌈layer_max⌋, processing reverts to step 3.

[STEP 6] initialization of a presentation loop of an adjustment range of the number of frames to a recording layer under the condition of the fixed number of [USB_BYTES]

CHECK_USB_[layer_nb]=⌈USER_BYTES⌋ [layer_nb]

CHECK_SUPPLY_[layer_nb]=ALL_SUPPLY_BYTES [layer_nb]

CHECK_DIFF [layer_nb]=SUM_DIFF [layer_nb]

CHECK_FRAME [layer_nb]=total_frame [layer_nb] provided that 0≦layer_nb≦layer_max, layer_nb=0.

[STEP 7] calculations of ⌈Gr_check⌋ gr [layer_nb]=CHECK_SUPPLY [layer_nb]/CHECK_DIFF [layer_nb]

GR [layer_nb]=gr [layer_nb]/Gr_avr (1) if Gr_min_limit≦GR [layer_nb]≦Gr_max_limit then Gcheck [layer_nb]=0;

(2) if GR [layer_nb]<GR [layer_nb]then Gcheck [layer_nb]=1;

(3) if Gr_max_limit<GR [layer_nb]then Gcheck [layer_nb]=2.

[STEP 8] presentation of the adjustment range

After adjustment of the number of frames, limitations on the maximum number of bytes of ⌈USB_BYTES⌋ should not be exceeded. For a recording layer on which limitations on the maximum number of bytes are already imposed, reduction of the number of frames is not allowed.

There is presented an adjustment value of the number of frames of the recording layer of [layer_nb] satisfying the following conditions:

QTY_change [layer_nb]==0 and
QTY_change [layer_nb+1]=0 and
Gcheck [layer_nb]==1 or 2; or
QTY_change [layer_nb]==1 and
QTY_change [layer_nb]+1==0 and
Gcheck [layer_nb]==2; or
QTY_change [layer_nb]==0 and
QTY_change [layer_nb+1]==1 and
Gcheck [layer_nb]==1.

There is detected the boundary of the number of frames satisfying

CHECK_SUPPLY [layer_nb]/Gr_max_limit/Gr_avr≦CHECK_DIFF [layer_nb] and

CHECK_DIFF [layer_nb]≦CHECK_SUPPLY [layer_nb]/Gr_min_limit Gr_avr and

CHECK_USB [layer_nb]/MAXRATE X KT X CHECK_FRAME [layer_nb] from

CHECK_DIFF [layer_nb]≦CHECK_SUPPLY [layer_nb]≦MAXRATE X KT X CHECK_FRAME [layer_nb].

Specifically, the following constraints:

MAX_CHECK_DIFF=CHECK_SUPPLY [layer_nb]/Gr_min_limit/Gr_avr

MIN_CHECK_DIFF=CHECK_SUPPLY [layer_nb]/Gr_max_limit/Gr_avr

MIN_CHECK_FRAME=CHECK_USB [layer_nb]/MAXRATE/KT and if layer_nb==layer_max-1, the following constraint MAX_CHECK_FRAME=CHECK_FRAME [layer_nb]+CHECK_FRAME [layer_nb]−CHECK_USB [layer_nb+1]/MAXRATE/KT are taken into consideration.

With CHECK_FRAME [layer_nb]=CHECK_DIFF [layer_nb], gen_bit[k]×ENCU_weight [encu_nb] of the portion of the ENCU other than the seamless angle portion of the recording layer shown by the [layer_nb] under consideration, where 0≦k≦k_max: the size of the Difficulty of the k'th frame, is summed sequentially to ⌈CHECK_DIFF [layer_nb]⌋ in the order of the lapse of the performance time, while the number of frame counts is sequentially summed to ⌈CHECK_FRAME [layer_nb]⌋ to find the range of k (frame range) satisfying the above conditions.

If there is any chapter point or a scene change point desirable as the boundary, the corresponding information is also presented.

If the boundary is changed so that

CHECK_DIFF [layer_nb]=CHECK_SUPPLY [layer_nb]/Gr_avr, the sum of the encoding difficulty of the recording layer whose boundary is to be changed and the number of frames are changed.

The result is that the sum of the encoding difficulty of the next [layer_nb] and the number of frames are corrected to CHECK_DIFF[layer_nb+1]=CHECK_DIFF[layer_nb]+
   CHECK_DIFF[layer_nb+1]−CHECK_DIFF[layer_nb]   (42)

CHECK_FRAME [layer_nb+1]=CHECK_FRAME[layer_nb]+
   CHECK_FRAME [layer_nb+1]−CHECK_FRAME
   [layer_nb]   (43).

[STEP 9]

layer_nb=layer_nb+1 is set and, if [layer_nb] is not of the same value as ⌈layer_max⌋, processing reverts to step 3.

Since changing the number of frames of each recording layer is tantamount to changing the site of recording of the material, the information such as material junction point (scene changing point) is crucial.

Figure 28:
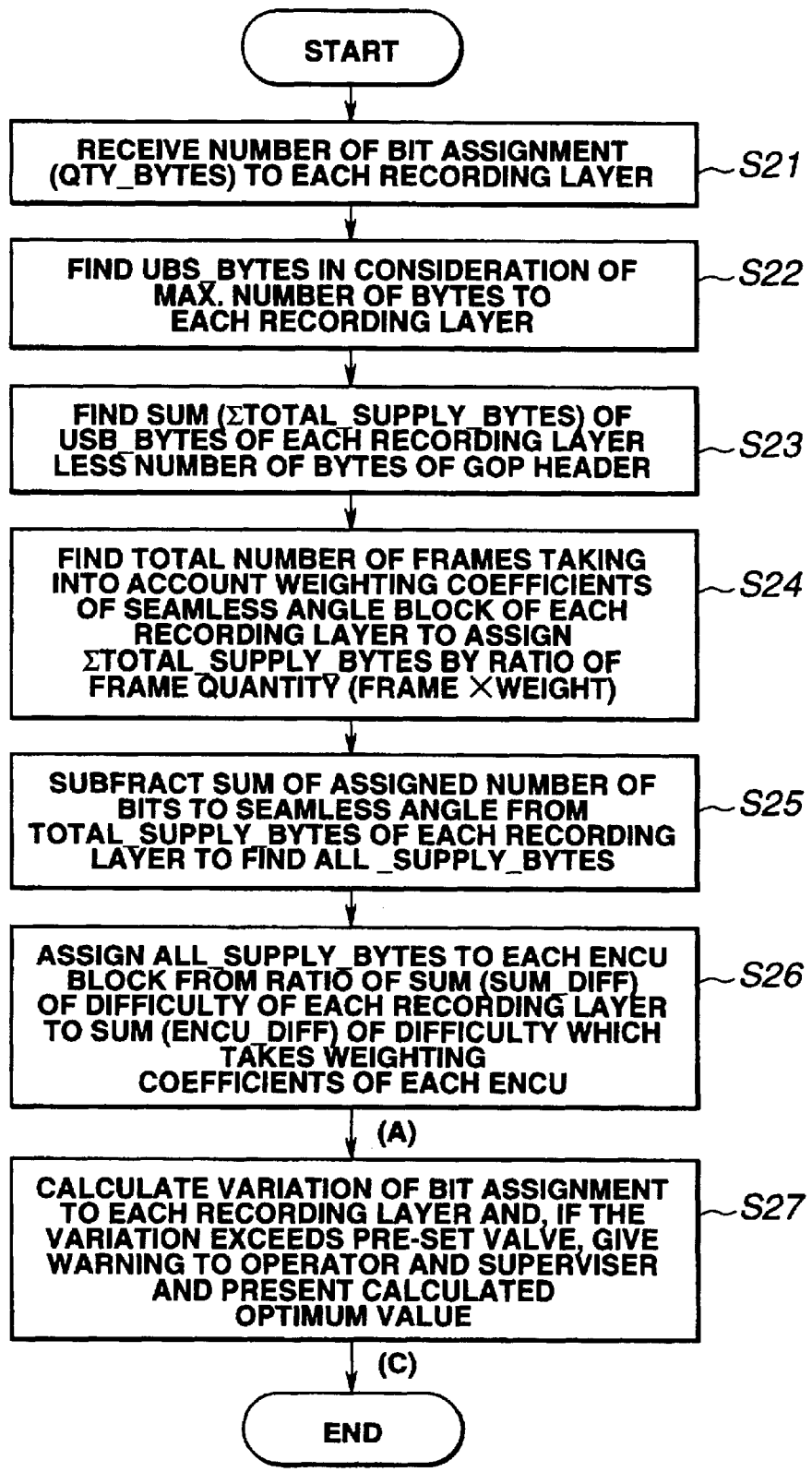
FIG. 28 is a flowchart showing the processing flow in steps 1 to 5 in the encoding method in an embodiment of the present invention.

FIG. 28 shows the processing flow of [STEP 1] to [STEP 5] of the above-described encoding method embodying the present invention.

At step S21, the number of assigned bits to each recording layer ⌈QTY_BYTES⌋ is received from the supervisor.

Then, at step S22, ⌈USB_BYTES⌋ is found taking into account the limitations on the maximum number of bytes of each recording layer.

At step S23, the sum [ΣTOTAL_SUPPLY_BYTES] of the ⌈USB_BYTES⌋ of the respective recording layers less the numbers of bytes of the ⌈GOP_Header⌋ is found.

Then, at step S24, the total number of frames ⌈ANGLE_WFRAME⌋ of the seamless angle blocks of the respective recording layers taking the weighting coefficients into account are found and ⌈ΣTOTAL_SUPPLY_BYTES⌋ is assigned to the respective angle blocks by the ratio of the frame quantity ⌈frame X weight⌋.

At the next step, the sum of the number of assigned bits to the seamless angles is subtracted from ⌈TOTAL_SUPPLY_BYTES⌋ of the respective recording layers to find ⌈ALL_SUPPLY_BYTES⌋.

Then, at step S26, ⌈ALL_SUPPLY_BYTES⌋ are assigned to the respective ENCU blocks, based on the ratio of the sum of the encoding difficulty (Difficulty) of each recording layer to the sum of the encoding difficulty taking into account the weighting coefficient of each ENCU.

At step S27, the variation of bit assignment for respective recording layers is calculated. If this variation exceeds a predetermined threshold value, this effect is advised to an operator and to the supervisor so that an optimum value is calculated and presented.

The above-described sequence of operations completes the processing of the [STEP 1] to [STEP 5] of the encoding method embodying the present invention.

Figure 29:
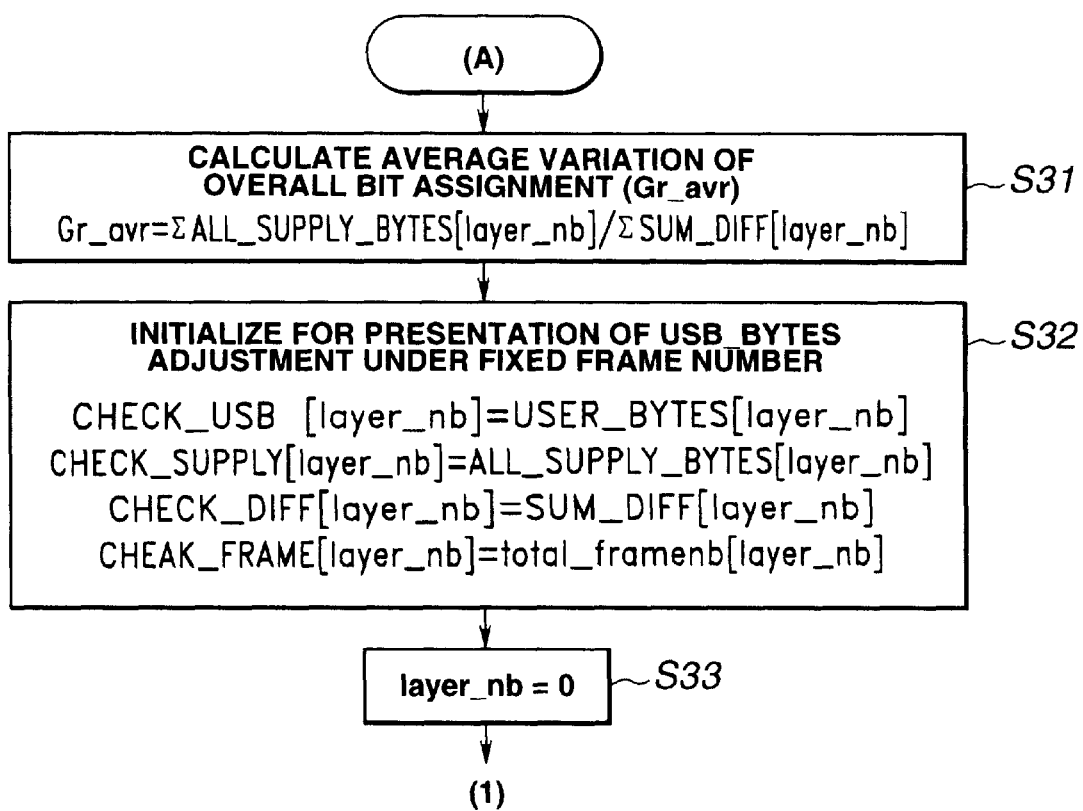
FIG. 29 is a flowchart showing the processing flow as to the method for presentation of an adjustment range of [USB_BYTES] under a frame number fixed condition in steps 6 to 9 in the encoding method in an embodiment of the present invention.
Figure 30:
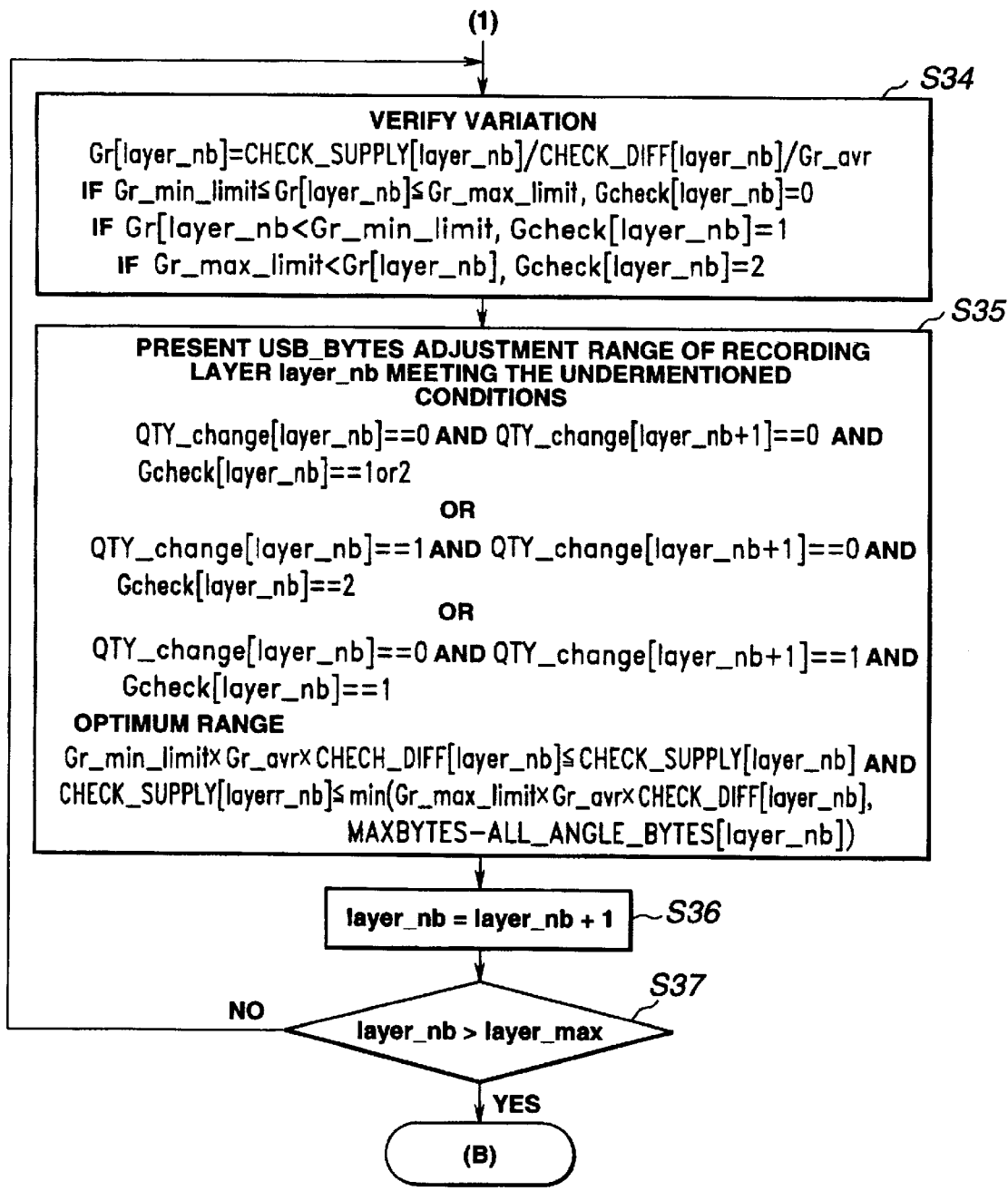
FIG. 30 is a flowchart, continued from FIG. 29, showing the processing flow as to the method for presentation of an adjustment range of [USB_BYTES] under frame number fixed condition in steps 6 to 9 in the encoding method in the embodiment of the present invention.

FIGS. 29 and 30 show the processing flow of the [STEP 6] to [STEP 9] of the encoding method embodying the present invention. These steps specify the method for presentation of the adjustment range of the USB_BYTES under the conditions of the fixed number of frames.

At step S31 of FIG. 29, an average value of the variation of the entire bit assignment ⌈Gr_avr⌉ is calculated.

$$Gr\_avr = \Sigma ALL\_SUPPLY\_BYTES[layer\_nb]/\Sigma SUM\_DIFF[layer\_nb]].$$

Then, at step S32, initialization is done for presentation of the adjustment range ⌈USB_BYTES⌉ under the condition of the fixed number of frames:

CHECK_USB_⌈layer_nb⌉=USER_BYTES ⌈layer_nb⌉

CHECK_SUPPLY ⌈layer_nb⌉=ALL_SUPPLY_BYTES ⌈layer_nb⌉

CHECK_DIFF ⌈layer_nb⌉=SUM_DIFF ⌈layer_nb⌉

CHECK_FRAME_⌈layer_nb⌉=total_frameb ⌈layer_nb⌉.

At step S33, layer_nb=0 is set.

Figure 39:
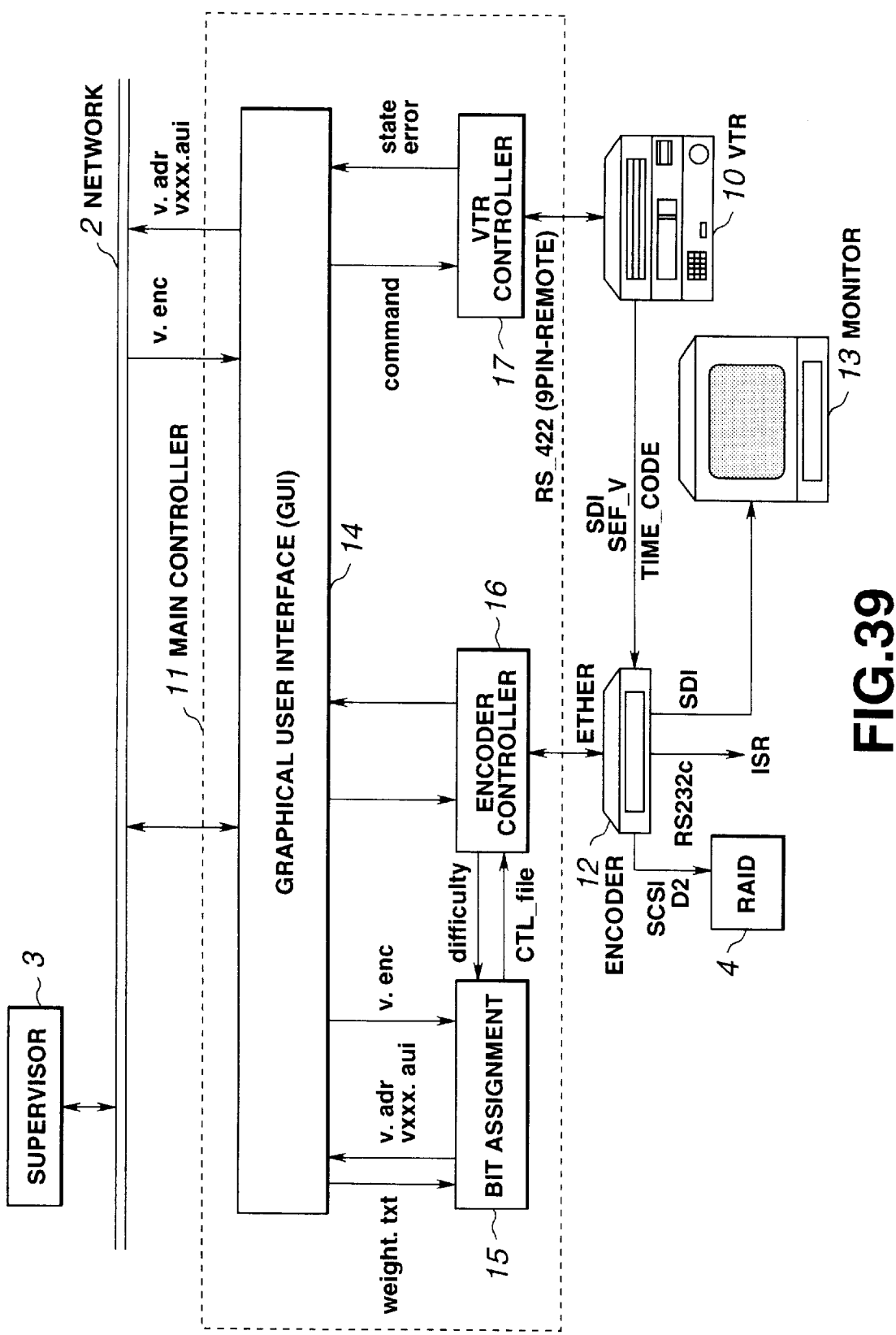
FIG. 39 illustrates a typical structure of a video encoding system in an embodiment of the present invention.

Then, at step S34 of FIG. 39, the variation is verified:

Gr ⌈layer_nb⌉=CHECK_SUPPLY ⌈layer_nb⌉/CHECK_DIFF ⌈layer_nb⌉/Gr_avr, (1) if Gr_min_limit≦Gr ⌈layer_nb⌉≦Gr_max_limit then, Gcheck ⌈layer_nb⌉=0;

(2) Gr ⌈layer_nb⌉≦Gr_min_limit, then, Gcheck ⌈layer_nb⌉=1; and (3) if Gr_min_limit<Gr ⌈layer_nb⌉then, Gcheck ⌈layer_nb⌉=2.

Then, at step S35, the adjustment range of ⌈USB_BYTES⌉ of the recording layer ⌈layer_nb⌉, satisfying the following conditions:

QTY_change [layer_nb]==0 and
QTY_change [layer_nb+1]==0 and
Gcheck [layer_nb]==1 or 2; or QTY_change [layer_nb]==1 and
QTY_change [layer_nb+1]==0 and
Gcheck [layer_nb]==2; or QTY_change [layer_nb]==0 and
QTY_change [layer_nb+1]==1 and
Gcheck [layer_nb]==1; is presented.

An optimum condition is

Gr_min_limit×Gr_avr×CHECK_DIFF [layer_nb]
≦CHECK_SUPPLY [layer_nb] and

CHECK_SUPPLY [layer_nb]
≦min (Gr_min_limit X Gr_avr X CHECK_DIFF [layer_nb],

MAXBYTE-ALL_ANGLE_BYTES [layer_nb].

Then, at step S36, layer_nb=layer_nb+1 is set.

At step S37, it is verified whether or not layer-nb>layer_max is satisfied. If this condition is not satisfied, the procedure as from step S34 is repeated. On the other hand, if this condition is not satisfied, the procedure as from step S34 is repeated. If the condition is not satisfied, processing transfers to the step of processing the presentation method of the adjustment range of the number of frames under the fixed number of bytes condition.

Figure 31:
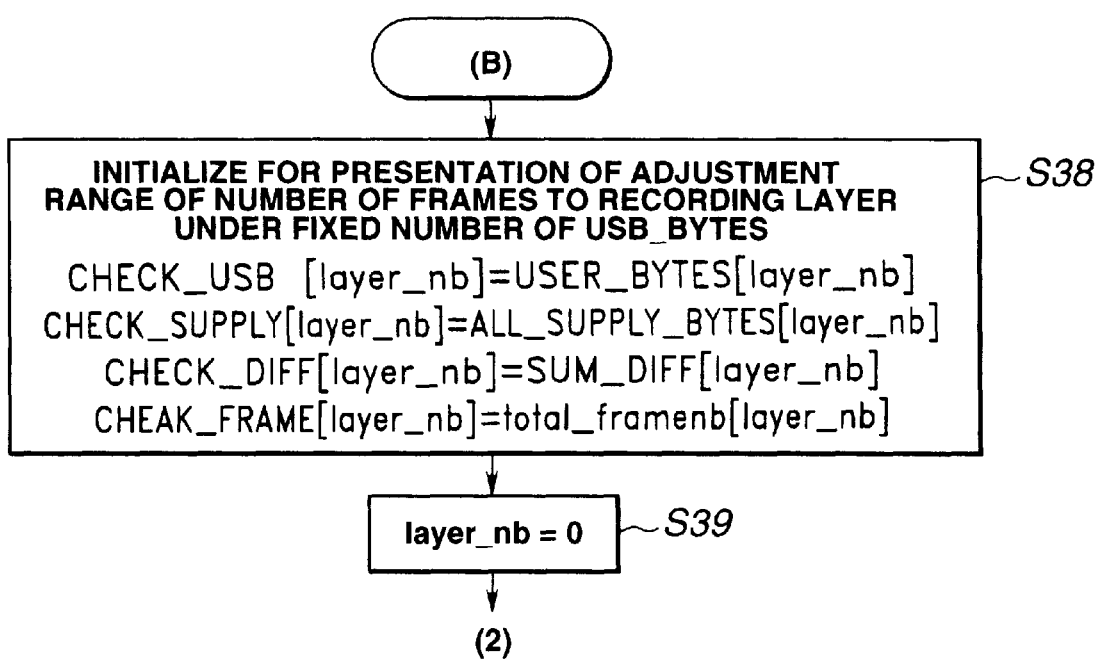
FIG. 31 is a flowchart showing the processing flow as to the method for presentation of an adjustment range of the number of frames under byte number fixed conditions in the encoding method in an embodiment of the present invention.

Then, at step S38 of FIG. 31, initialization is done for presentation of the adjustment range of the number of frames to the recording layers under the condition of the fixed ⌈USB_BYTES⌉:

CHECK_USB_⌈layer_nb⌉=USER_BYTES ⌈layer_nb⌉

CHECK_SUPPLY_⌈layer_nb⌉=ALL_SUPPLY_BYTES ⌈layer_nb⌉

CHECK_DIFF_⌈layer_nb⌉=SUM_DIFF ⌈layer_nb⌉

CHECK_FRAME ⌈layer_nb⌉=total_frameb ⌈layer_nb⌉.

Meanwhile, prior to step S38, an average value of the variation of the entire bit assignment needs to be calculated. To this end, the value obtained at step S31 of FIG. 9 can be used.

At step S39, layer_nb=0 is set.

Figure 32:
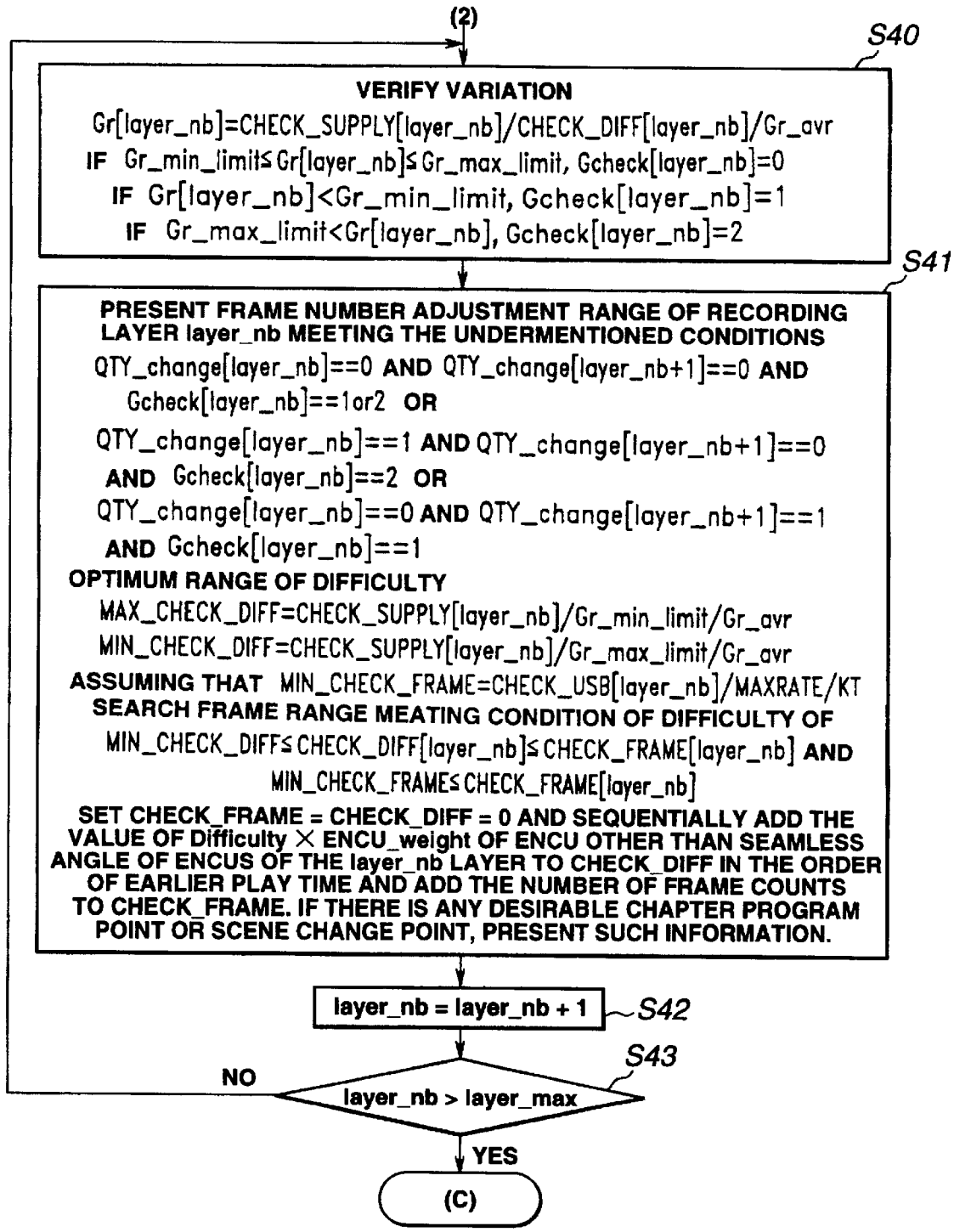
FIG. 32 is a flowchart, continued from FIG. 31, showing the processing flow as to the method for presentation of an adjustment range of the number of frames under byte number fixed conditions in the encoding method in the embodiment of the present invention.
Figure 33A:
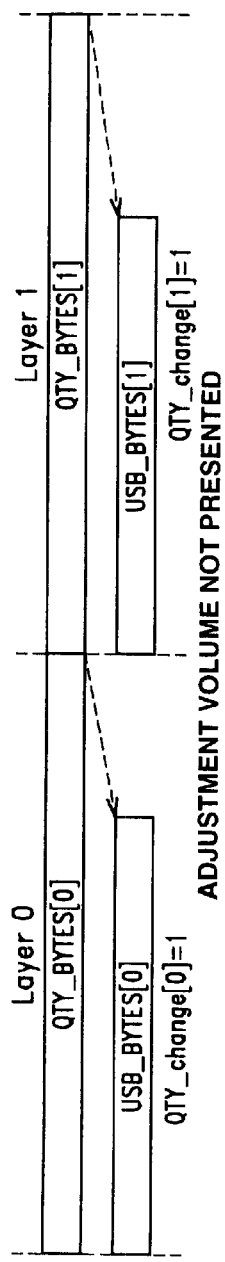
FIGS. 33A to 33D show the classification of the processing in which [MAXBYTES] limitations are already imposed in a recording medium having two recording layers.
Figure 33B:
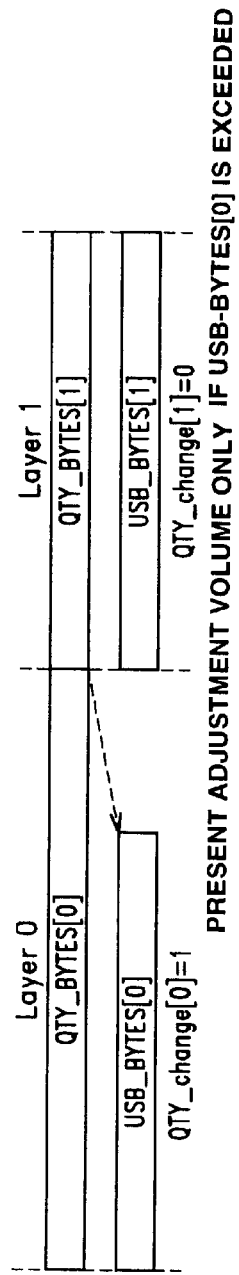
Figure 33C:
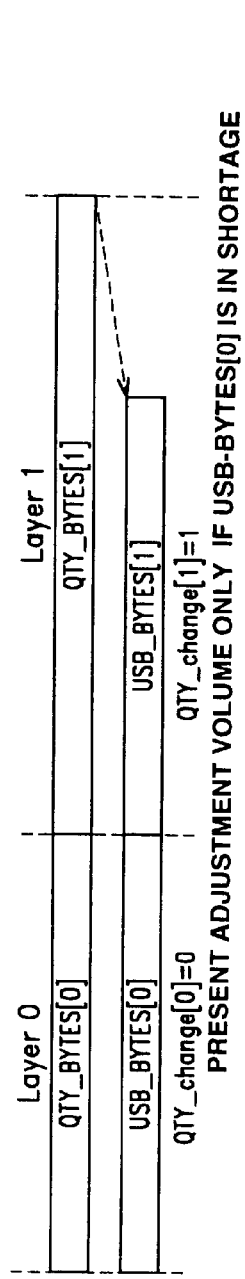
Figure 33D:
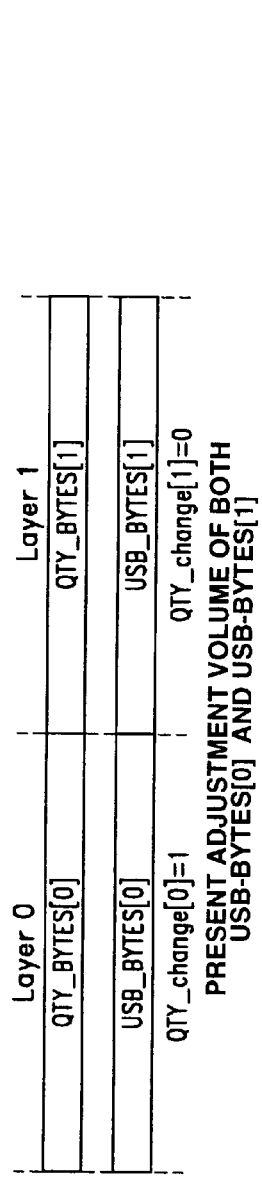

Then, at step S40 of FIG. 32, the variation is verified:

Gr ⌈layer_nb⌉
=CHECK_SUPPLY ⌈layer_nb⌉/CHECK_DIFF ⌈layer_nb⌉/Gr_avr;

If Gr_min_limit≦Gr ⌈layer_nb⌉/Gr_max_limit, then, Gcheck ⌈layer_nb⌉=0;

if Gr ⌈layer_nb⌉<Gr_min_limit, then, Gcheck ⌈layer_nb⌉=1; and if Gr_min_limit<Gr ⌈layer_nb⌉ then, Gcheck ⌈layer_nb⌉=2.

Then, at step S41, the adjustment range of the number of frames of the recording layer ⌈layer_nb⌉, satisfying the following conditions:

QTY_change [layer_nb]==0 and
QTY_change [layer_nb+1]==0 and
Gcheck [layer_nb]==1 or 2; or QTY_change [layer_nb]==1 and
QTY_change [layer_nb+1]==0 and
Gcheck [layer_nb]==2; or QTY_change [layer_nb]==0 and
QTY_change [layer_nb+1]==1 and
Gcheck [layer_nb]==1 is presented.

If the optimum range is

MAX_CHECK_DIFF=CHECK_SUPPLY [layer_$nb$]/$Gr\_min$_limit/Gr_avr

MIN_CHECK_DIFF=CHECK_SUPPLY [layer_nb]/Gr_max_limit/Gr_avr

MIN_CHECK_FRAME=CHECK_USB [layer_nb]/MAXRATE/KT the size of the Difficulty X ENCU_weight of the portions other than the seamless angles of the ENCUs of the layer_nb layers is sequentially summed to ⌈CHECK_DIFF⌉ while the frame counts are summed to ⌈CHECK_FRAME⌉ in the order of the lapse of the performance time, provided that the condition of MIN_CHECK_DIFF≦CHECK_DIFF [layer_nb]
≦MIN_CHECK_DIFF is met

MIN_FRAME=CHECK_DIFF=0.

If there is any chapter point or a scene change point desirable as a boundary in the range, such information is also presented.

Then, at step S42, layer_nb=layer_nb+1 is set.

At step S43, it is verified whether or not layer_nb>layer_max is met. If this condition is not met, the processing as from step S40 is repeated. If the condition of step S43 is met, the above-described processing is terminated.

If the number of bits or frames assigned to the respective recording layer is changed, new limitations are imposed by the condition [MAX_BYTES]. It may be premeditated from this that, if such limitations are already imposed, there are occasions wherein the number of bits or frames cannot be changed.

FIG. 33 shows the classification of the processing in which the limitations of [MAXBYTES] are already imposed on the recording medium such as the so-called DVD.

Figure 34A:
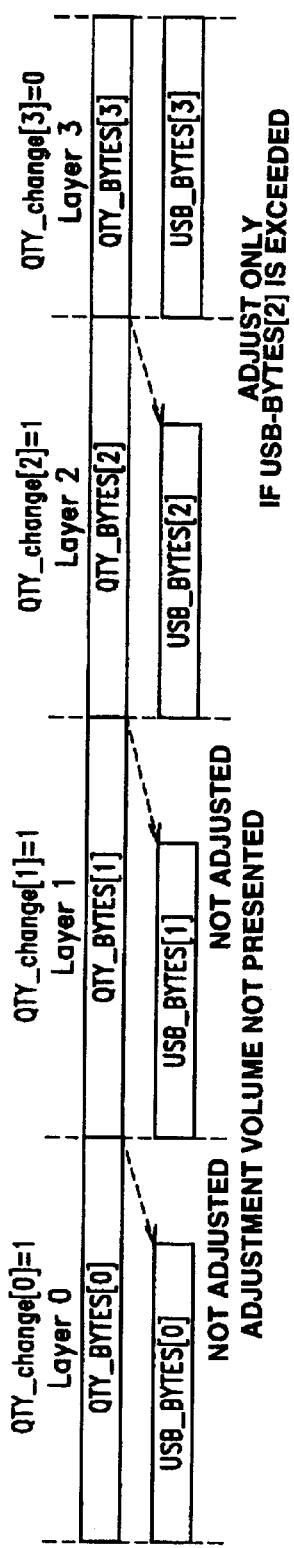
FIGS. 34A to 34C illustrate typical processing in case the conditions of FIGS. 33A to 33D are adapted to a recording medium having four recording layers.
Figure 34B:
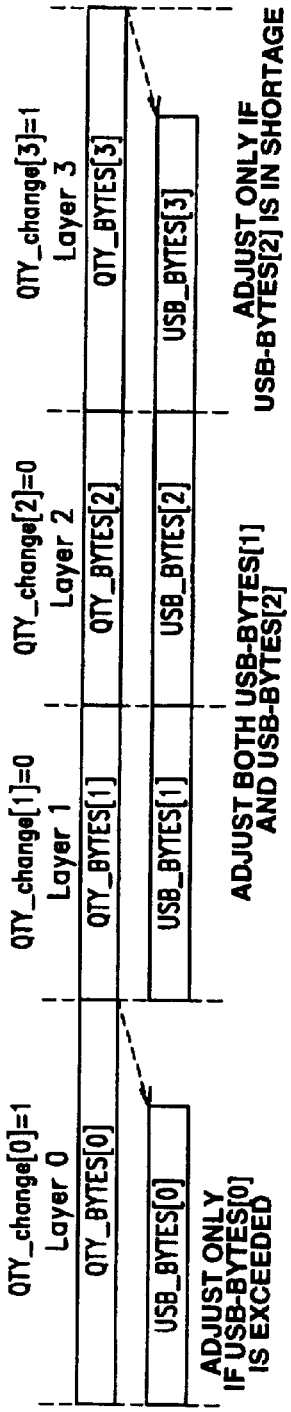
Figure 34C:
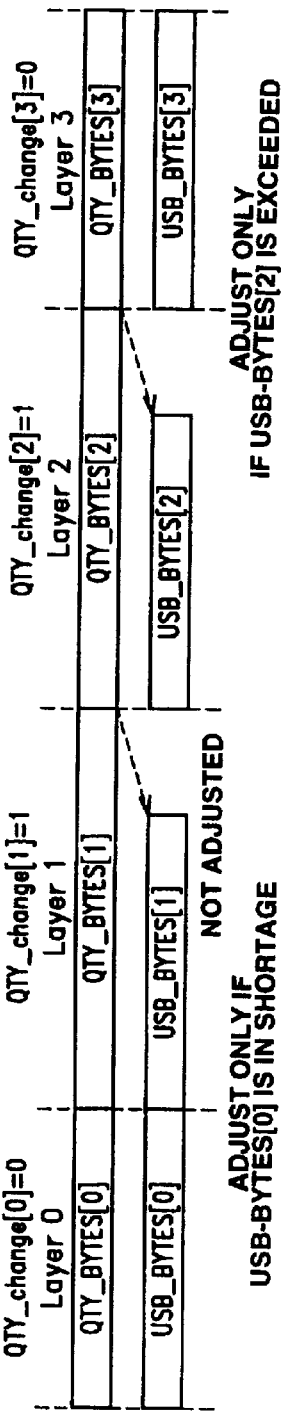
Figure 37A:
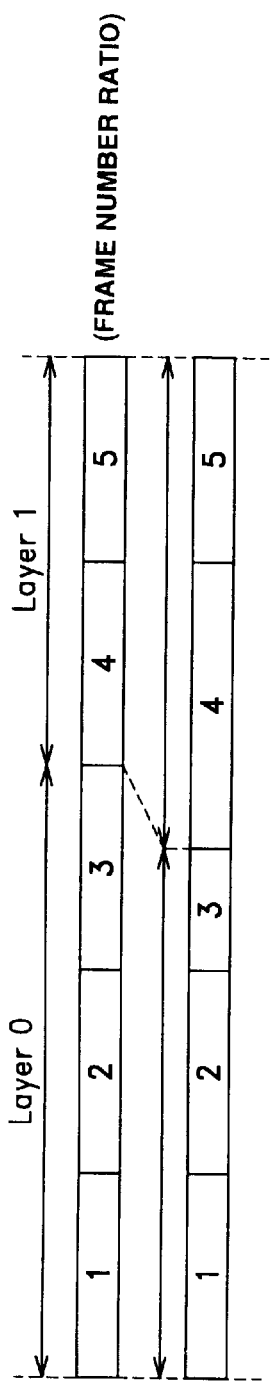
FIGS. 37A to 37C illustrate typical processing in case the conditions of FIG. 36 are adapted to a recording medium having four recording layers.
Figure 37B:
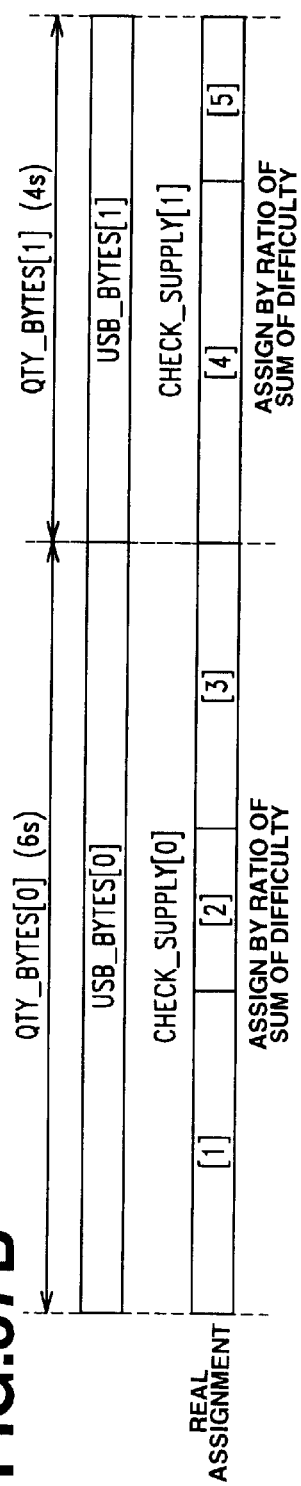
Figure 37C:

FIG. 34 shows an instance in which adaptation to the above condition has been realized in a recording medium having four recording layers.

Taking an example of doing bit assignment for a disc having two recording layers, such as DVD, the above-mentioned classification of the processing is explained. In the following description, it is assumed that Gr_min_limit=0.9
Gr_max_limit=1.1.

(1) If Gr[0]<0.9
ALL_SUPPLY_BYTES [0] is in shortage relative to SUM_DIFF [0];
(2) if 1.1<Gr[0]
ALL_SUPPLY_BYTES [1] is in shortage relative to SUM_DIFF [1]; and
(3) otherwise, no processing is executed.
<A> An optimum range [CHECK_USB] to be searched in case of a fixed number of frames is
0.9×Gr_avr×CHECK_DIFF [0]
≦CHECK_SUPPLY [0]≦1.1×Gr_avr×CHECK_DIFF [0]
CHECK_USB [0]
=CHECK_SUPPLY [0]+ALL_ANGLE_BYTES [0]+ TOTAL_HEADER [0].
<B> An optimum range of the number of recording frames [CHECK_FRAME] to be searched in case of a fixed number of frames is
CHECK_SUPPLY [0]/1.1/Gr_avr.

As the gen_bit[k]×_ENCU_weight [encu_nb] of the ENCUs other than the seamless angle of [layer 0] are sequentially summed to re-calculate [CHECK_DIFF [0]], the range of k which satisfies the above condition is found. If there is any chapter point or a scene change point in the range that is desirable as the boundary, such information is also presented.

FIGS. 35 to 38 show instances of such bit re-assignment by correction to an optimum range.

It may be seen that, in each of these instances, the relation between the sum of the encoding difficulty (Difficulty) and the quantity of bit assignment is ideal.

An encoding device embodying the present invention is hereinafter explained.

FIG. 39 shows an illustrative structure of a video encoding system embodying the present invention.

Figure 2:
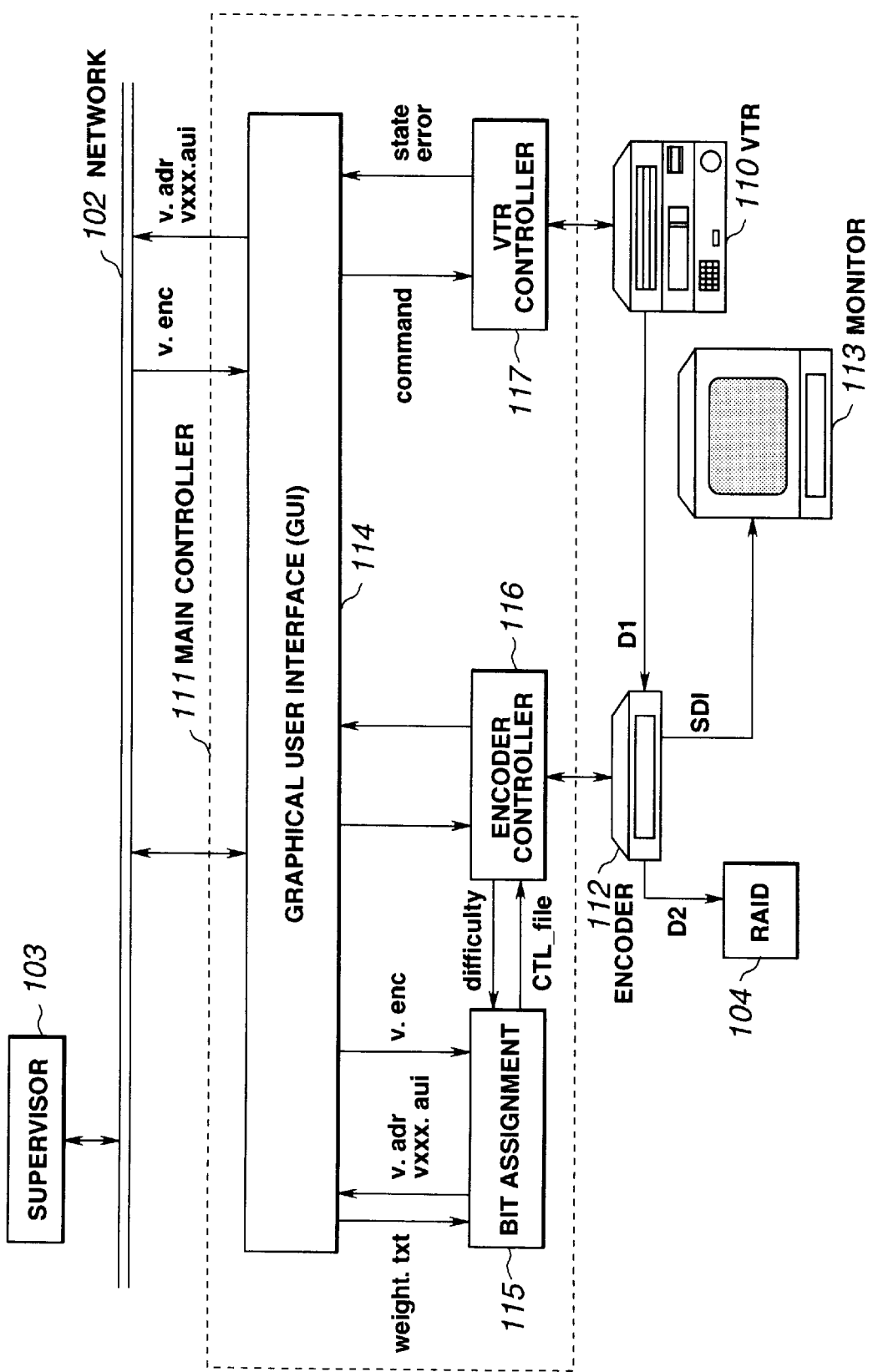
FIG. 2 shows an illustrative structure of a conventional video encoding system.
Figure 3:
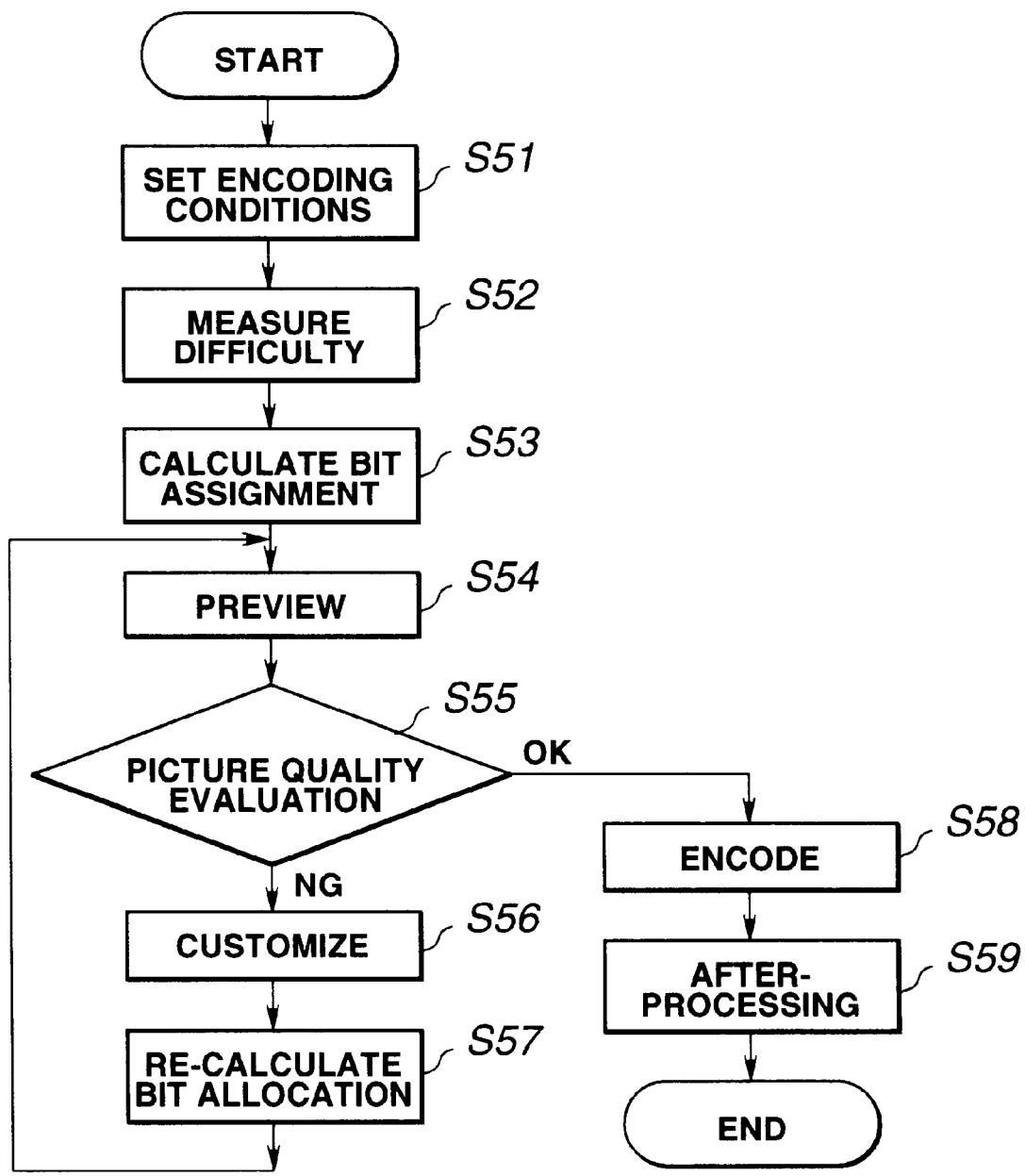
FIG. 3 is a flowchart showing the low of a conventional encoding operation.
Figure 4:
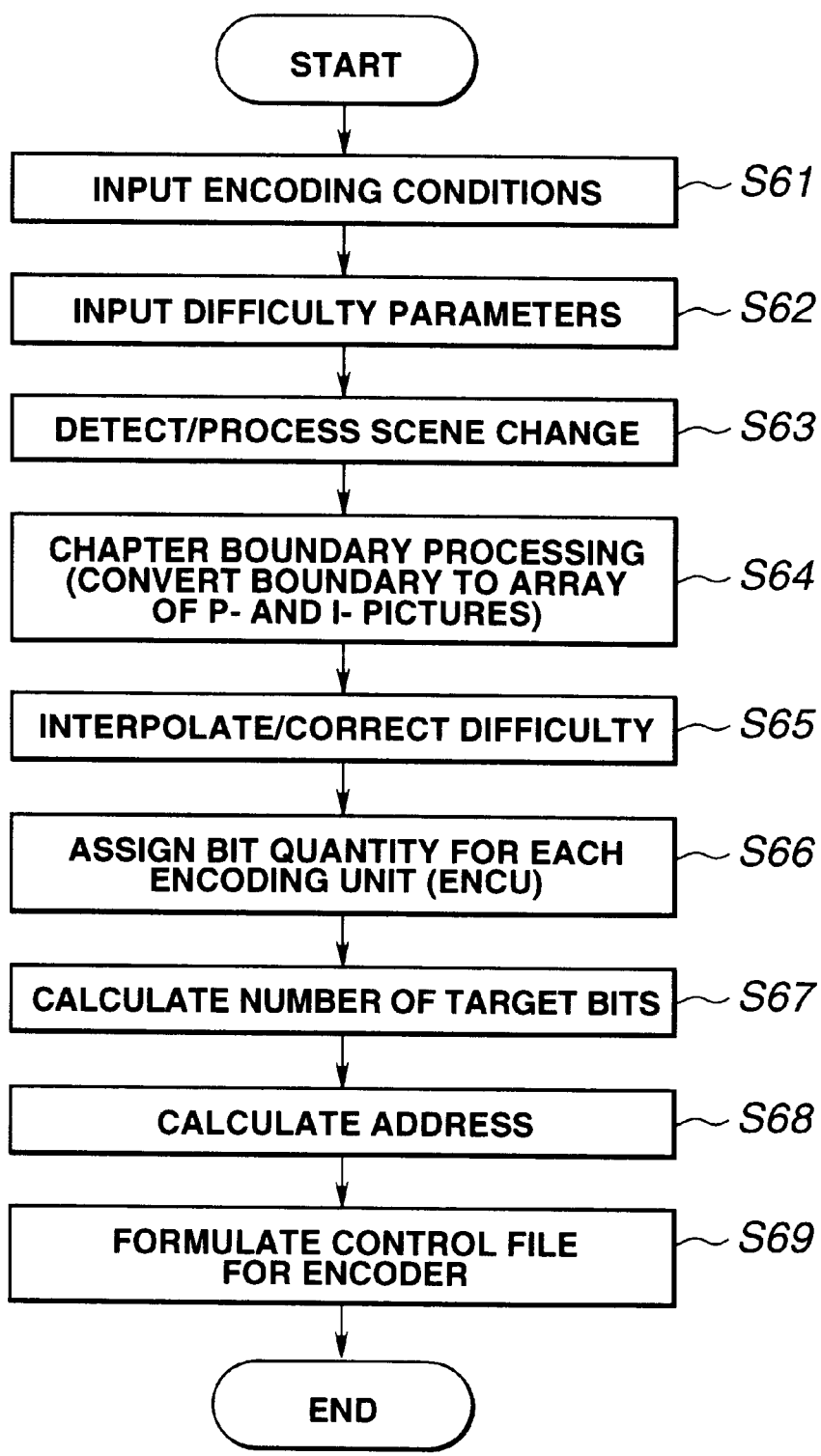
FIG. 4 is a flowchart showing a typical sequence of bit assignment calculations in a conventional encoding operation.
Figure 5:
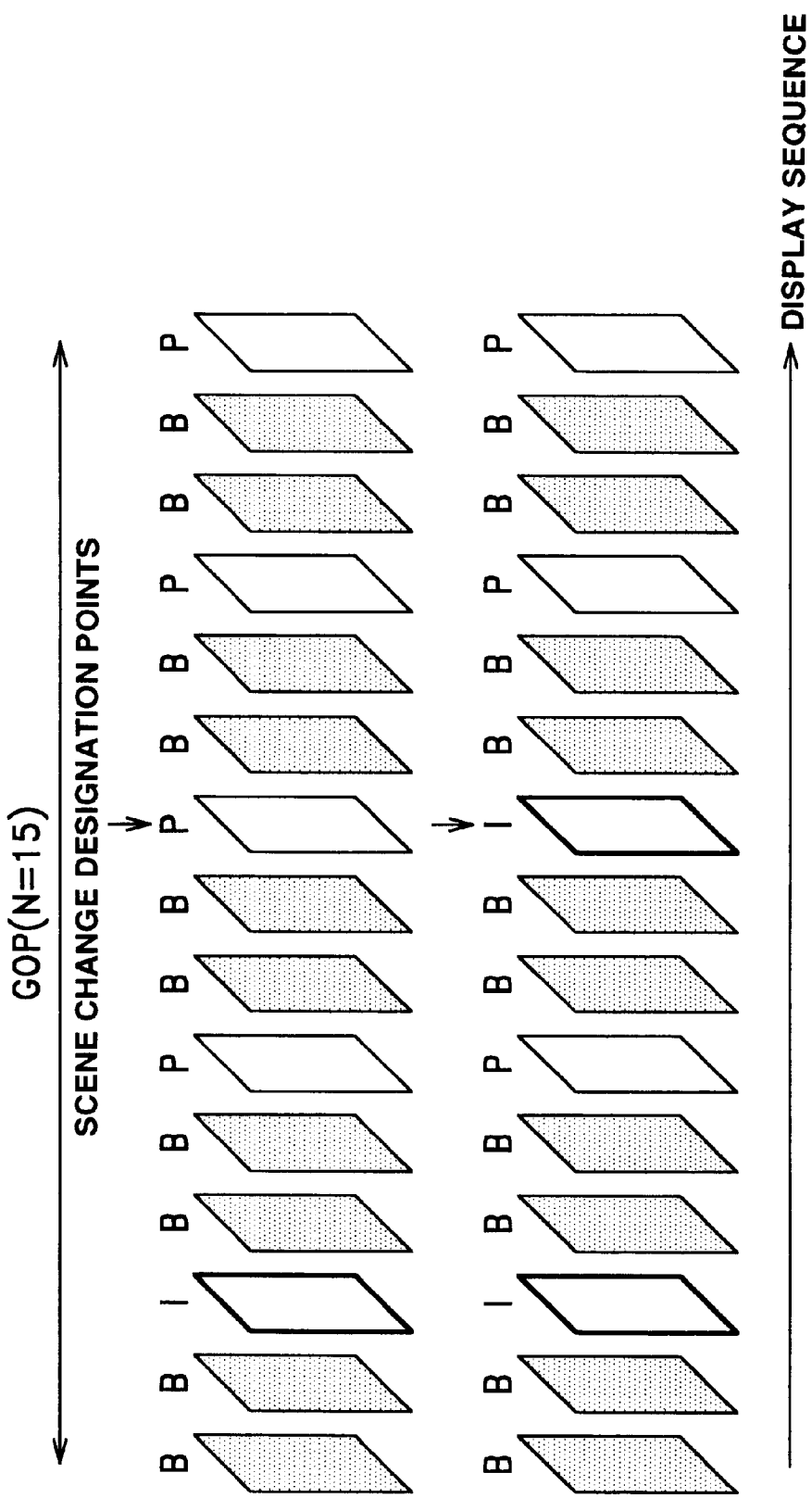
FIG. 5 illustrates scene change detection/processing in a conventional encoding operation.
Figure 6:
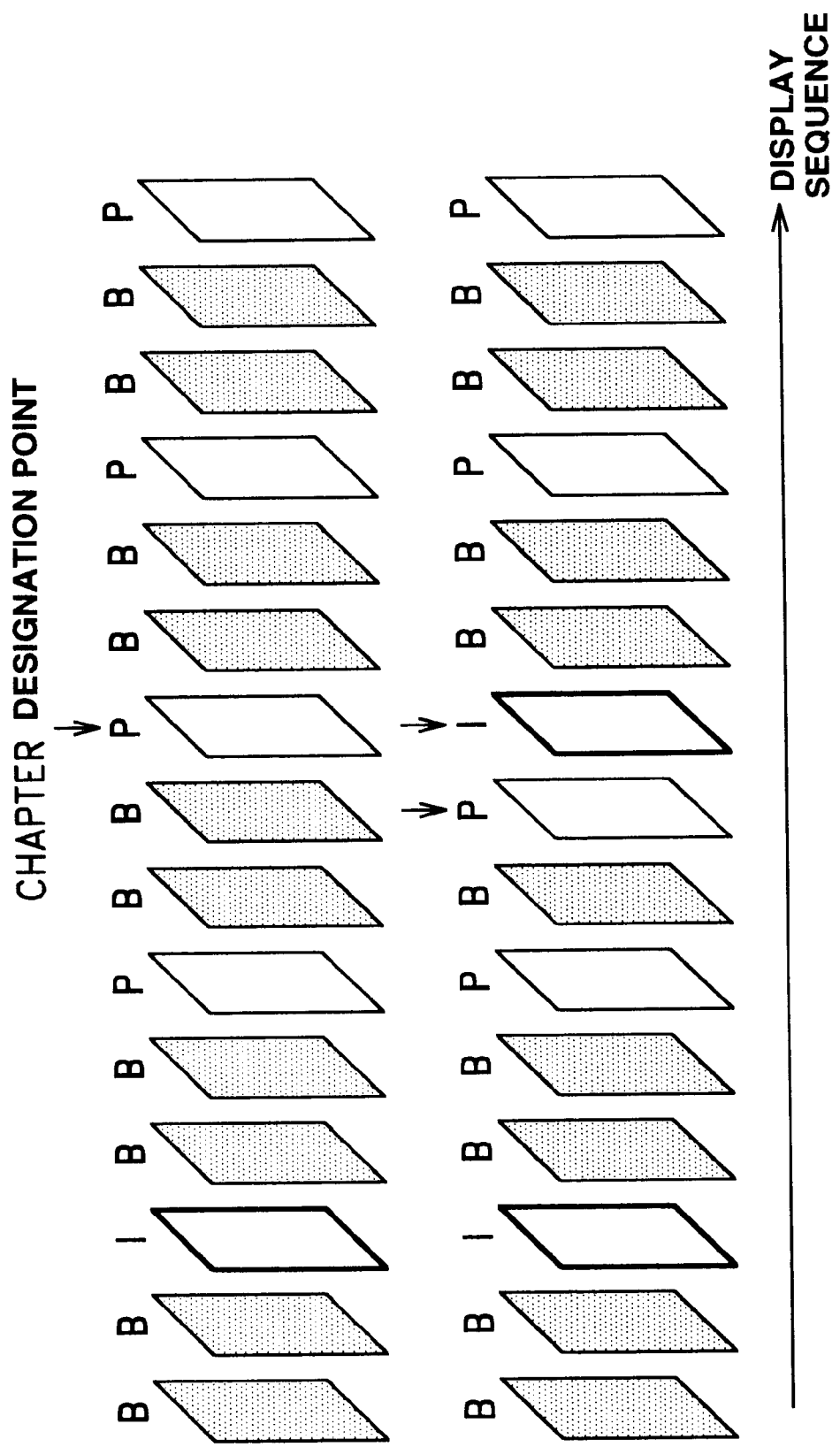
FIG. 6 illustrates processing of a chapter designated frame in the conventional encoding operation.
Figure 7:
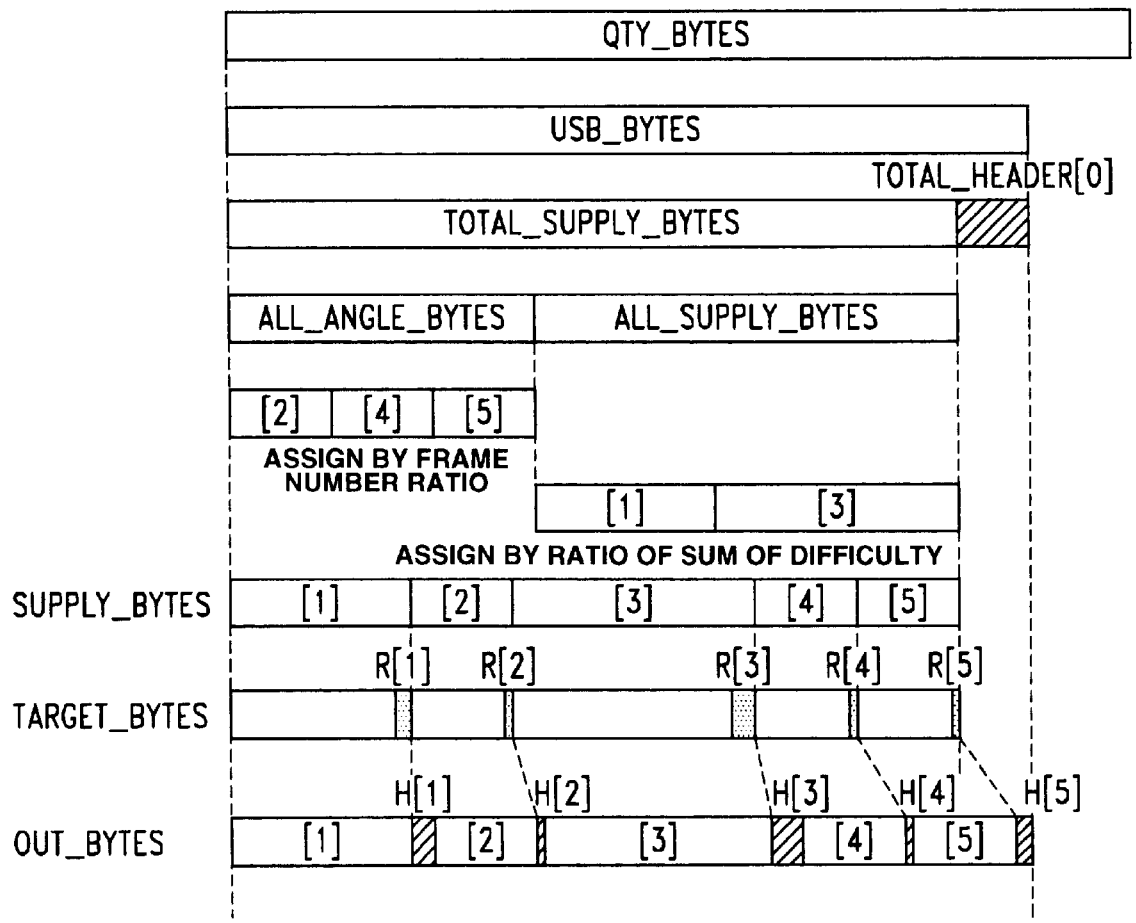
FIG. 7 illustrates typical bit assignment to each encoding unit (ENCU) in an embodiment of the present invention.
Figure 8:
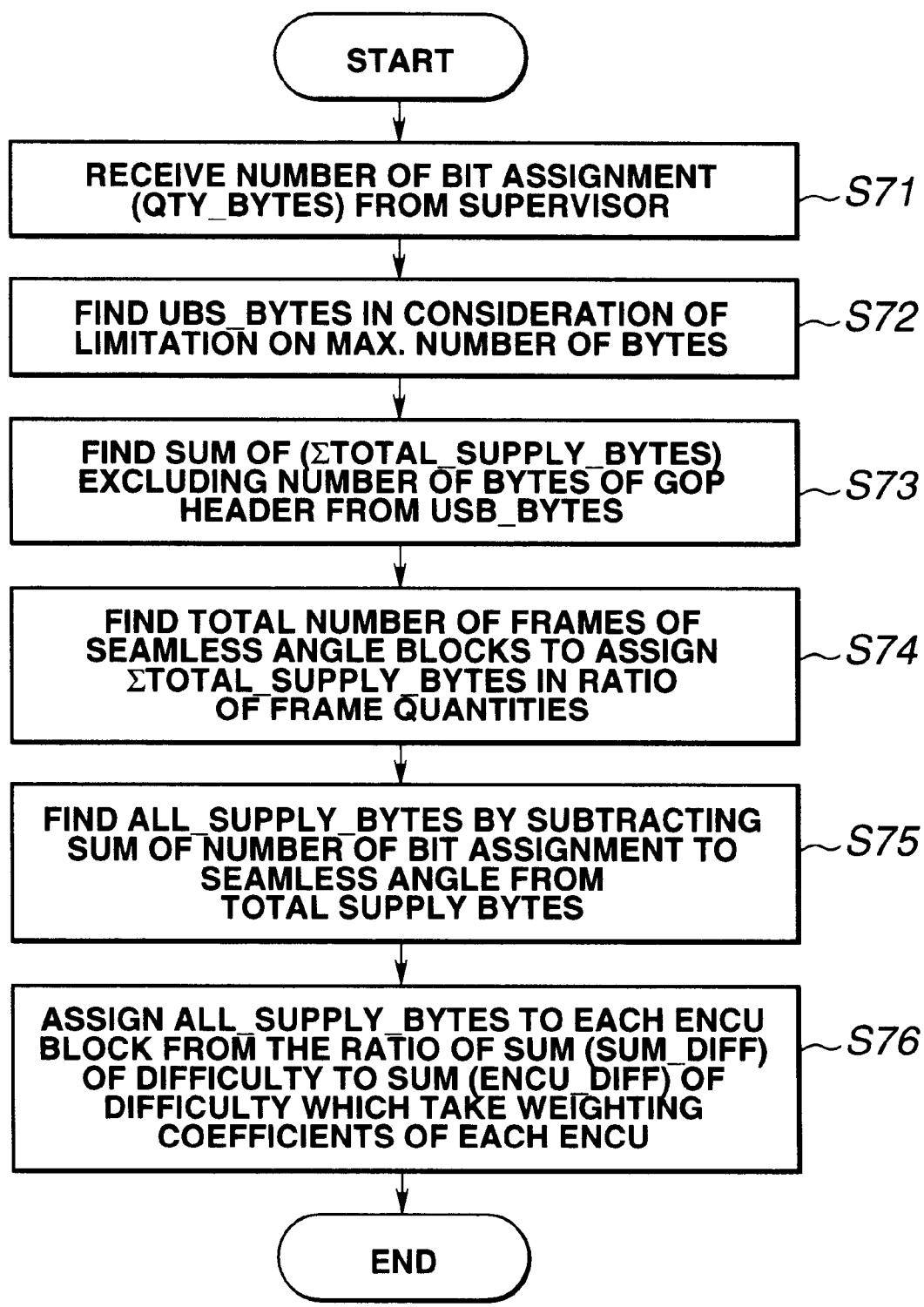
FIG. 8 is a flowchart illustrating the basic sequence of bit assignment which takes the weighting coefficient for the seamless angle portion into account according to an embodiment of the present invention.
Figure 10:
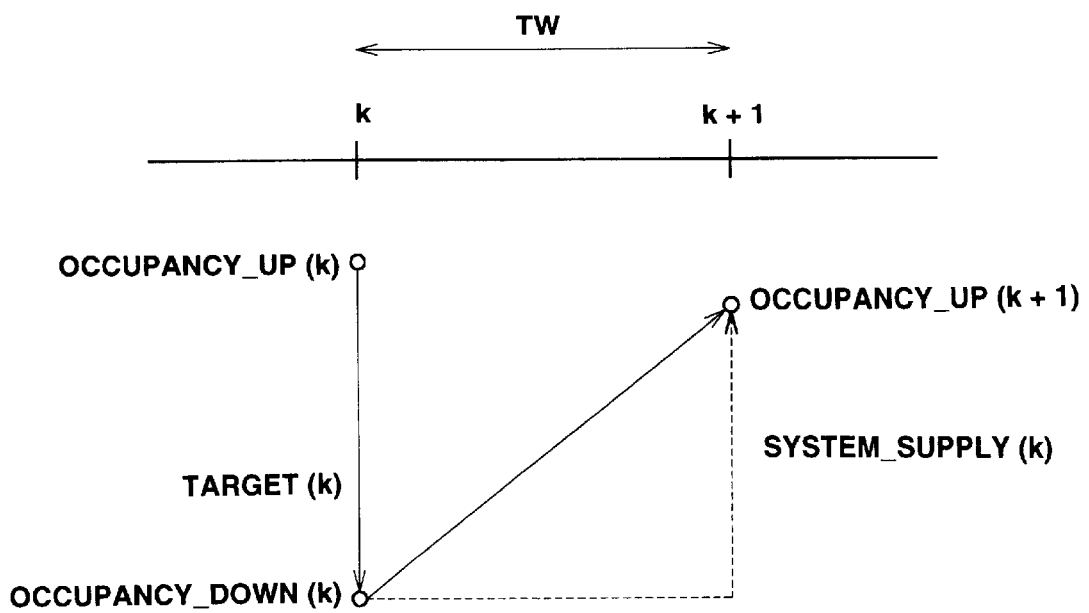
FIG. 10 illustrates the calculating method for a video buffering verifier VBV.
Figure 11:
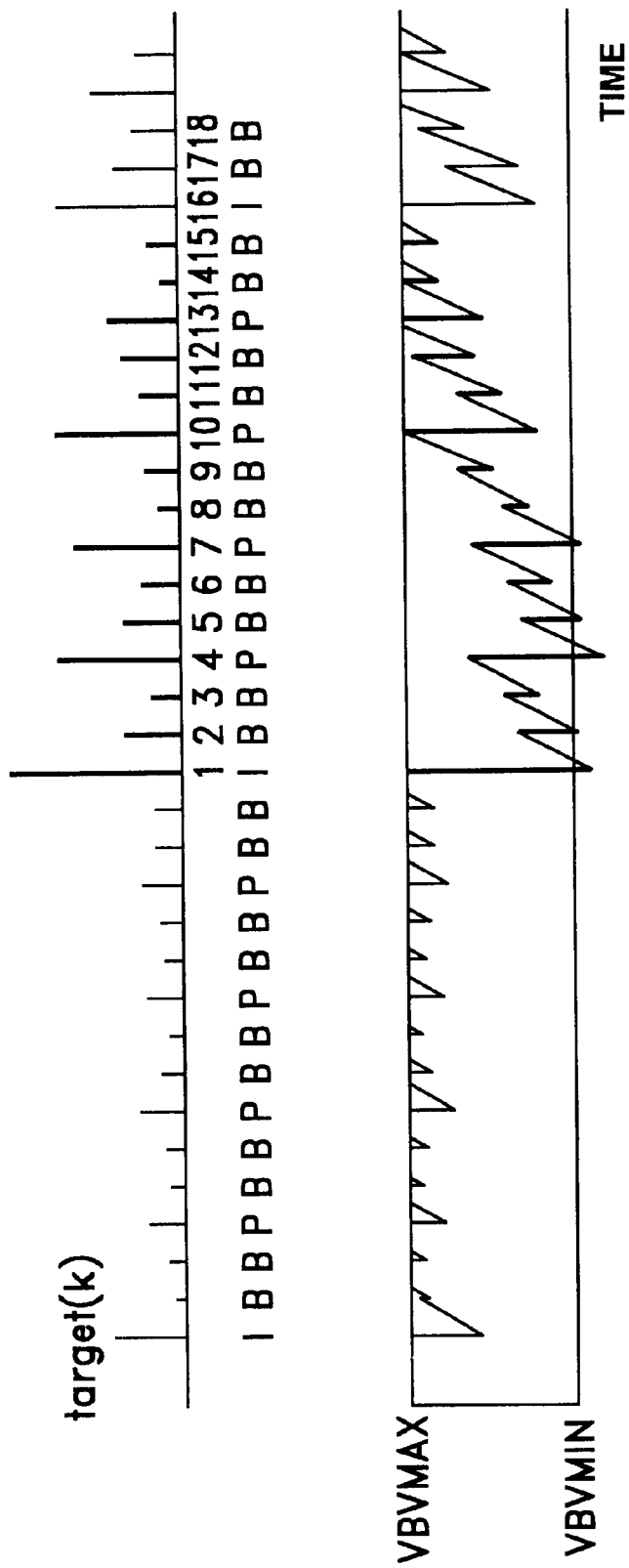
FIG. 11 shows typical target bit assignment in case VBV buffer calculations are executed for a target quantity found in consideration of the evaluation function and [GO_MAXRATE] limitations.
Figure 12:
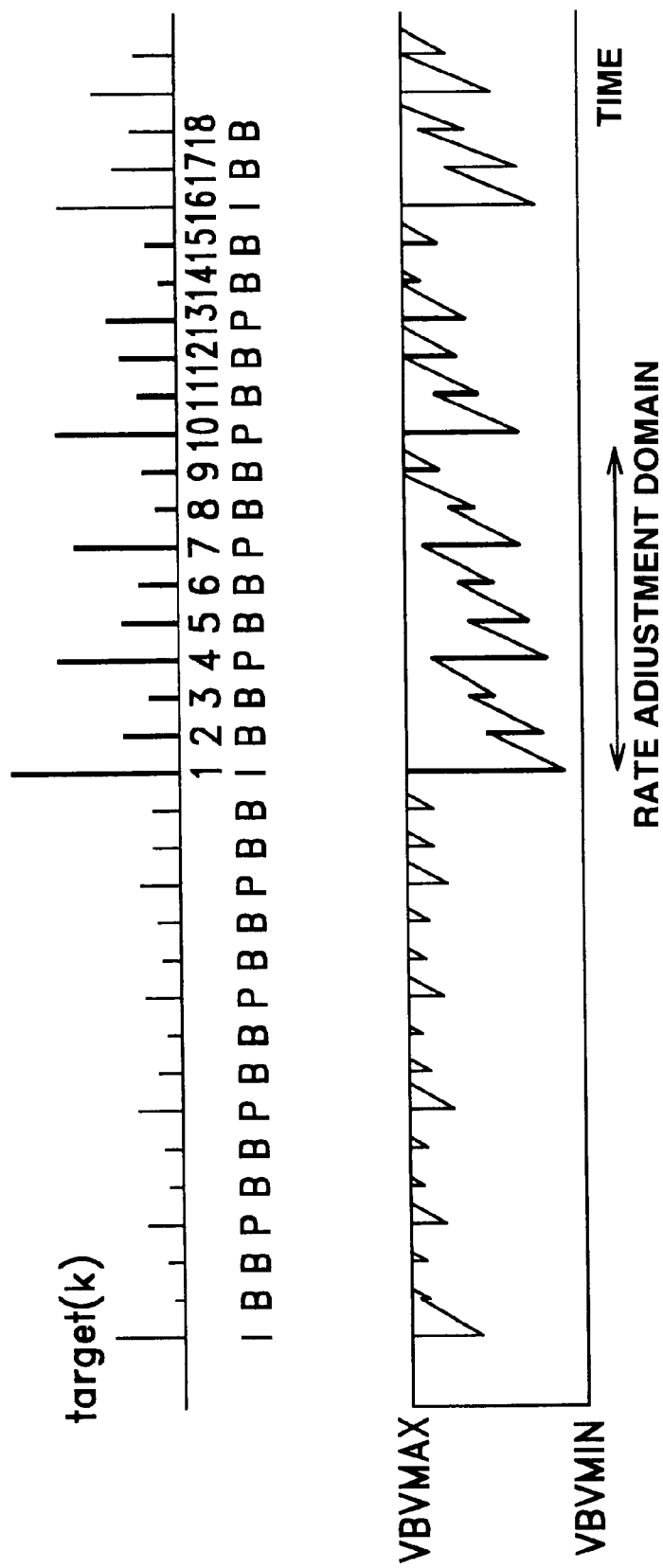
FIG. 12 illustrates typical target bit assignment following VBV limitation processing.
Figure 15:
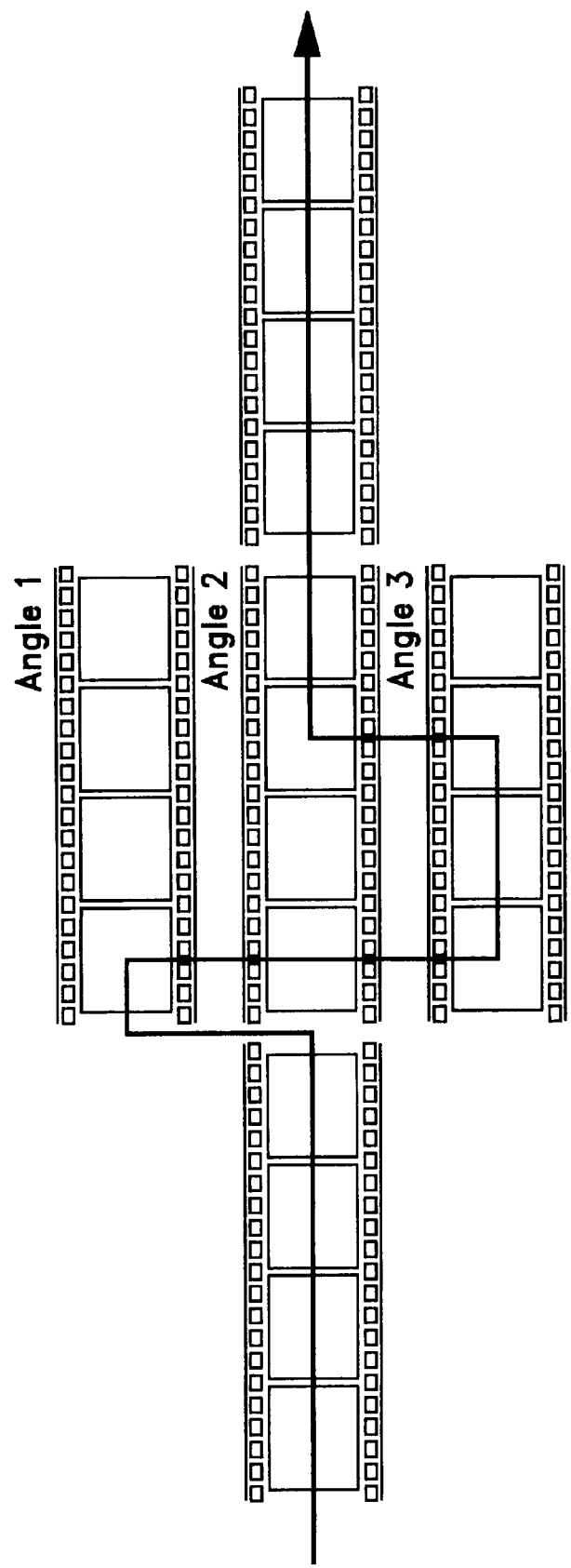
FIG. 15 illustrates angle blocks and angle reproduction in case the material contains such angle blocks.
Figures 16A, 16B:
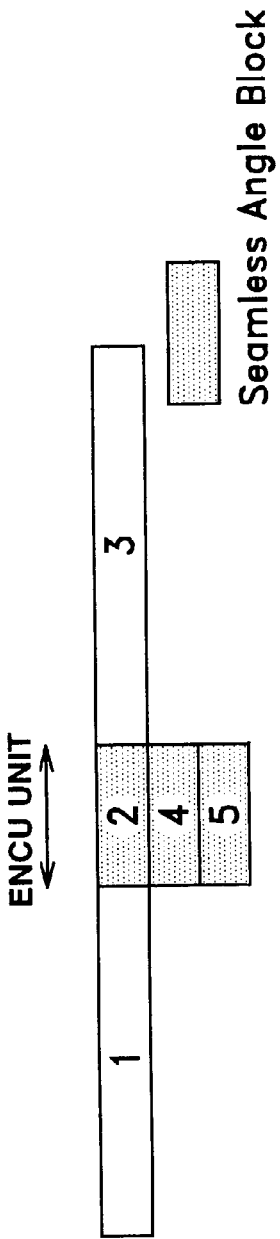
FIGS. 16A and 16B illustrate a case in which the material contains angle blocks.
Figures 17A, 17B, 17C:
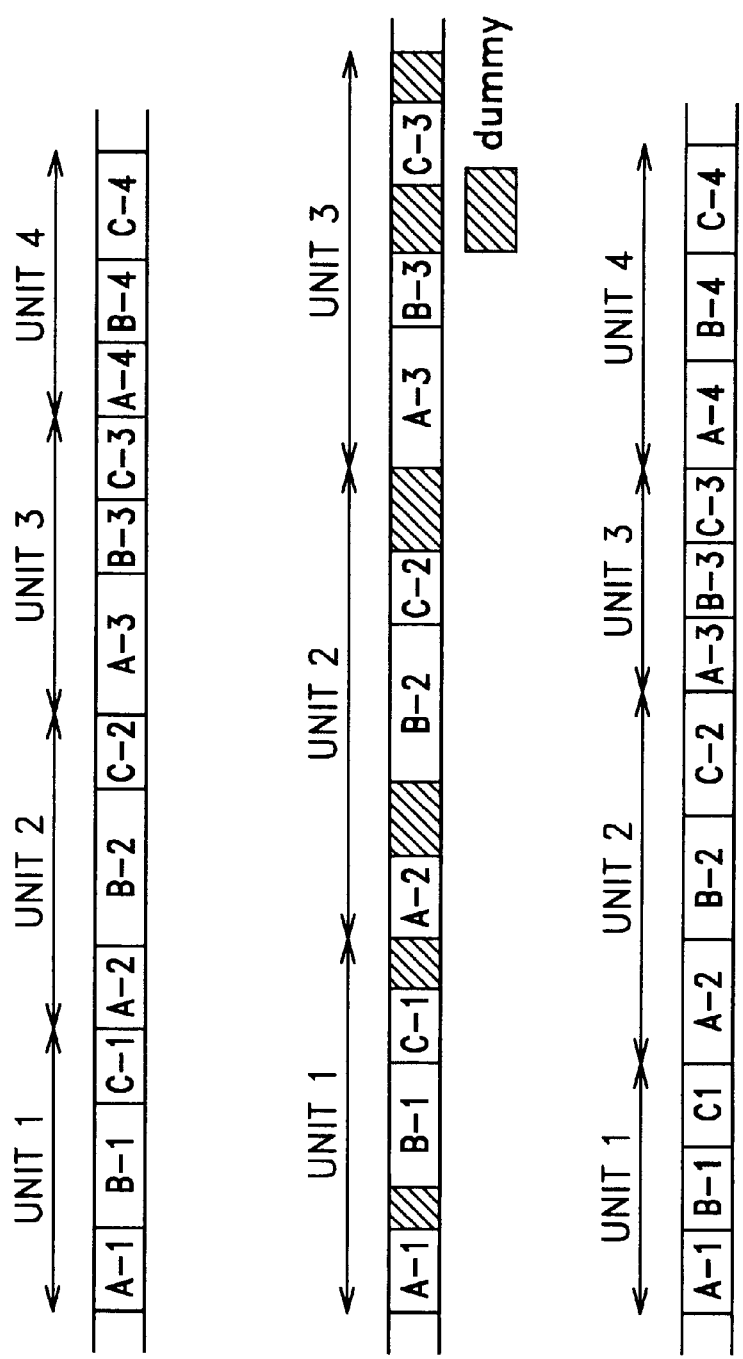
FIGS. 17A, 17B and 17C illustrate interleaving processing.
Figure 18:
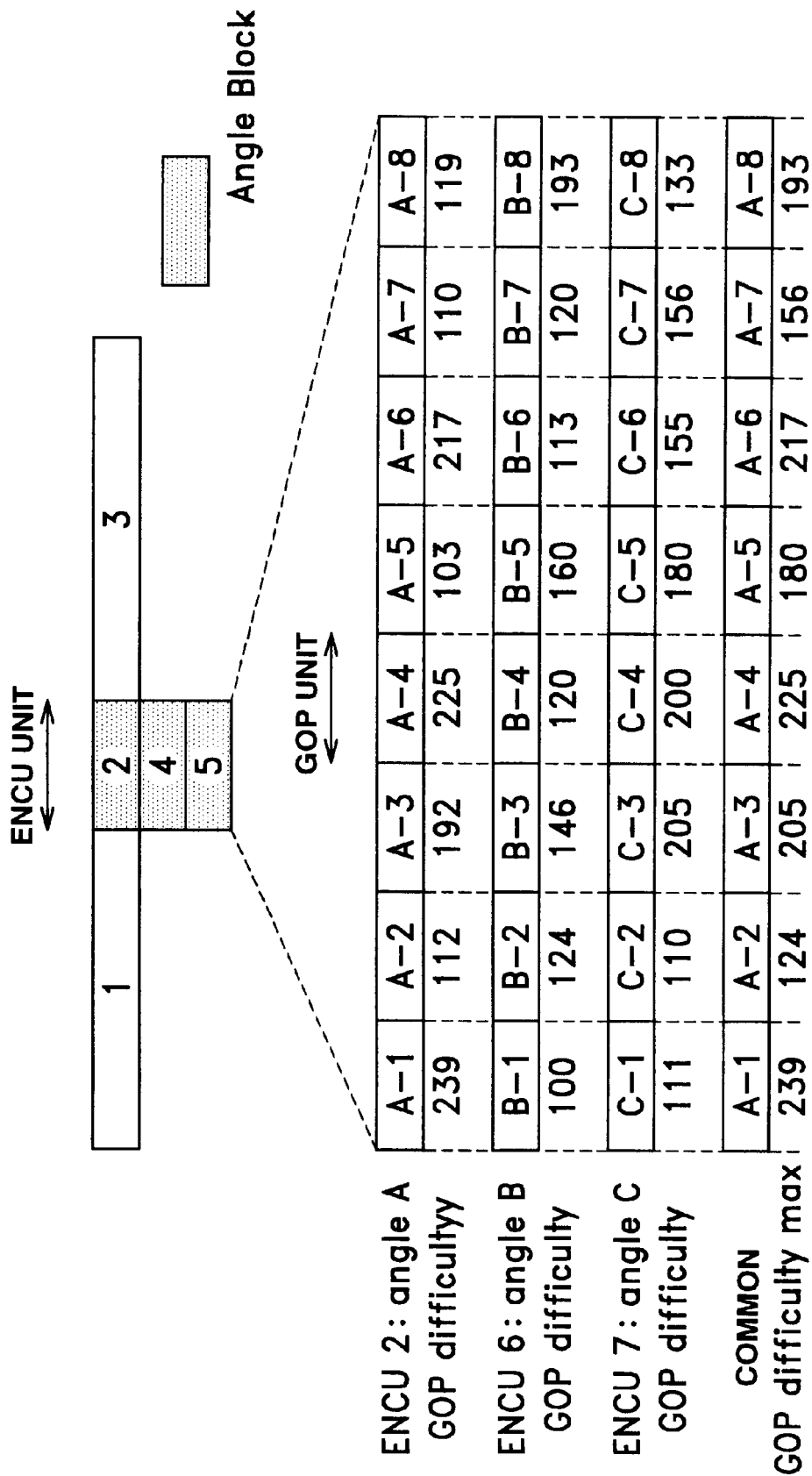
FIG. 18 illustrates processing of seamless angle blocks.
Figure 19A:
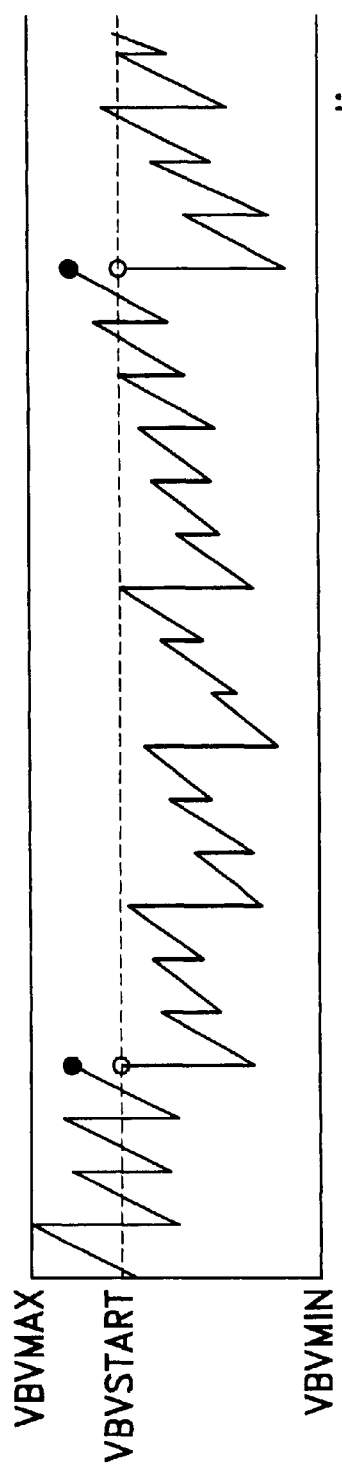
FIGS. 19A and 19B illustrate typical encoding and decoding under limiting the VBV residual quantity.
Figure 19B:
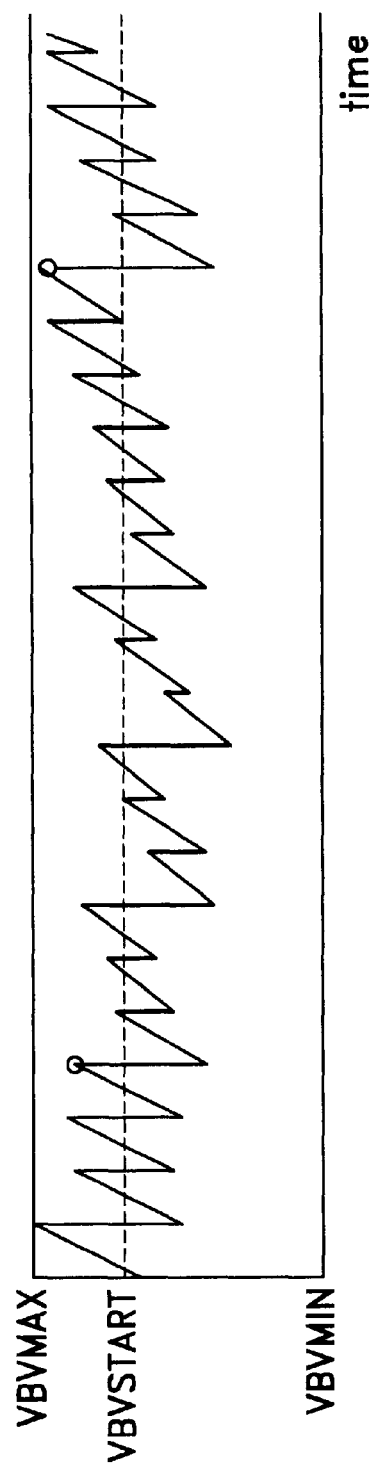
Figure 20:
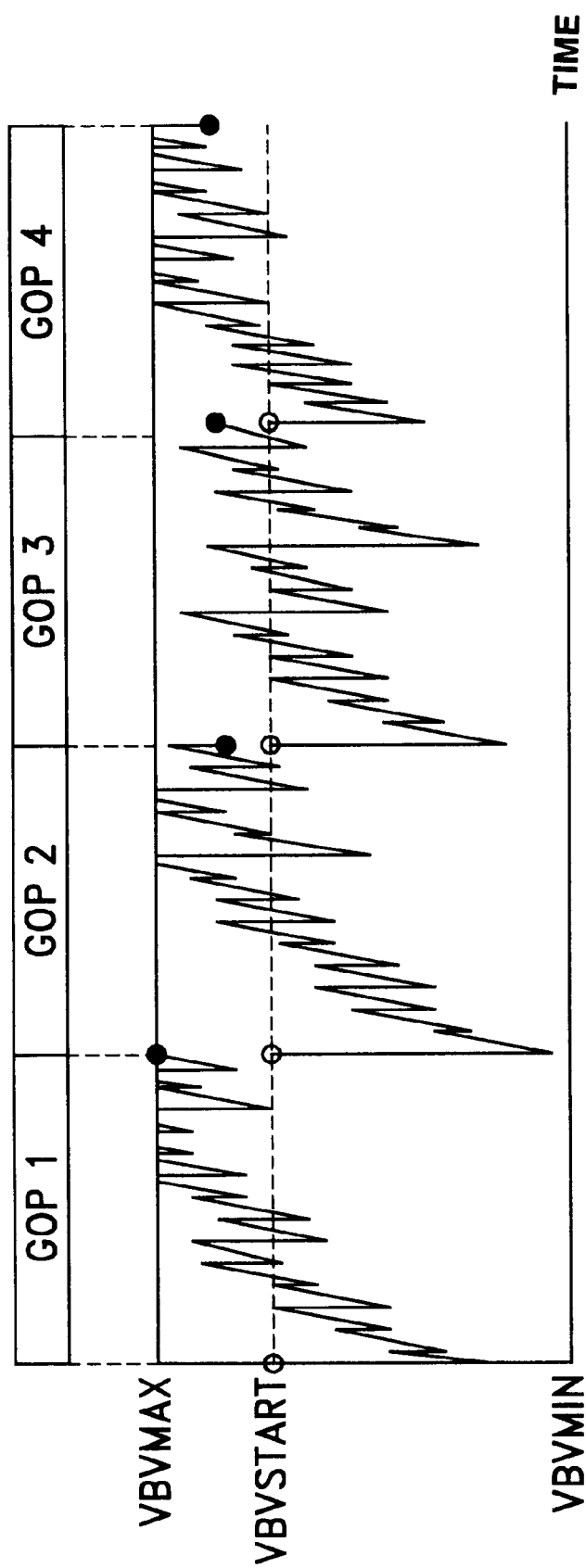
FIG. 20 illustrates the manner in which first and last VBV values of all GOPs are controlled to be not less than a preset value in seamless angle.

The present video encoding system can be used for authoring etc by applying the above-described encoding method embodying the present invention for encoding the video information for the digital video disc (DVD). The basic structure of the video encoding system can be substantially the same as that of the conventional video encoding system shown in FIG. 2.

The main controller 11 is made up of a computer allocated to the present video encoding system and is configured for having data communication with the supervisor 3 over the network 2 to control the operation of the entire video encoding system.

Specifically, the main controller 11 accepts control from the supervisor 3 and the operator's actuation, in a manner not shown, under control by the graphical user interface (GUI), to control the operation of the encoder 12 and the video tape recorder (VTR) 10 by the bit assignment unit 15, encoder controller 16 and the VTR controller 17. The main controller 11 encodes the material being processed, under the encoding conditions advised by the supervisor 3, to advise the processing results to the supervisor 3. The main controller 11 also accepts the operator's setting via GUI 14 unit to modify the detailed encoding conditions.

Specifically, the GUI unit 14 of the main controller 11 supervises three programs, namely a bit assignment program [BIT_ASSIGN] of the bit assignment unit 15, an encoder control program [CTRL_ENC] of the encoder control unit 16 and the VTR control program of the VTR control unit 17.

The bit assignment unit 15 sets the encoding conditions, on the frame basis, in accordance with the encoding file [v. enc] communicated from the supervisor 3, and communicates control data by these conditions by the file format [CTL file] to the control unit 16.

At this time, the bit assignment unit 15 sets bit assignment for encoding) and modifies the so-set conditions responsive to the operator's actuations. If the compressed video data D2 is recorded on the RAID 4 via encoder 12 or SCSI, tie bit assignment unit 15 communicates the address data [v. adr] to the supervisor 3 along with the information such as data quantity required for the downstream side multiplexing [xxxx. aui].

The encoder control unit 16 controls the operation of the encoder 12, over the Ethernet ETHER, in accordance with the control file [CTL file] communicated from the bit assignment unit 15. The encoder control unit 16 also communicates data, such as encoding difficulty Difficulty, required for encoding, to the bit assignment unit 15, on the frame basis, in order to communicate data of the recording address of the RAID 4, having the video data V2 recorded thereon, and data required for subsequent multiplexing.

The VTR control unit 17 controls the operation of the video tape recorder VTR 10, via RS-422 (a 9-pin remote controller) in accordance with the editing list advised from the supervisor 103, in order to reproduce the material of the desired editing object.

The video tape recorder VTR 10 reproduces the video data D1 recorded on the magnetic tape, in accordance with the editing list advised from the supervisor 3 via main controller 11, to output [SDI], [REF V] or [TIME CODE] of the processing object to the encoder 12. This VTR 10 is usually a digital VTR.

The encoder 12 switches the conditions, in accordance with the conditions communicated from the supervisor 3 via the main controller 11, to encode the video data D1 outputted from the VTR 10 by the MPEG (Moving Picture Experts Group) technique.

The encoder 12 communicates the results of the encoding processing to the main controller 11, which then controls the encoding conditions and the quantity of generated bits. This permits the main controller 11 to grasp the quantity of bits generated by data compression on the frame basis.

During the preliminary processing of setting the encoding conditions foi two-path encoding, that is provisional encoding, the encoder 12 simply compresses video data from the VTR 10 to communicate the processing results to the main controller 11. However, during ultimate processing for data compression, that is ultimate encoding, the encoder 12 records the compressed video data D2 on the RAID 4 to communicate the data quantity and the data recording address to the main controller 11.

The monitor device 13 is configured for monitoring the video data D2 encoded by the encoder 12. The monitor device 13 permits the video encoding system to perform so-called pre-view whereby an operator is able to confirm the results of data compression as the occasion may demand. The operator is able to actuate the main controller 11 based on the preview results, to modify the encoding conditions in detail.

There are displayed on the monitor device 13 an alarm stating that, based on the encoding difficulty measured during the provisional encoding, the bit assignment under the prevailing encoding condition gives rise to an unallowable difference in the picture quality between the recording layers, or the advisable conditions, such as bit assignment, felt to be optimum.

With the above-described encoding method and apparatus embodying the present invention, the variation of the picture quality of plural recording layers or recording areas under the encoding conditions as set by the supervisor in the video two-path encoding system can be predicted and evaluated prior to execution of the ultimate encoding.

Although the foregoing description is directed to bit assignment to plural recording layers of the DVD, the present invention can be applied to bit assignment to data recorded across plural partitioned recording layers provided in the same recording layer.

Although the foregoing description is directed to encoding of video data recorded on a recording medium having plural recording layers, the basic algorithm of the processing of the present embodiment of the present invention can also be adapted to an audio processing system for two-path variable-bitrate encoding in which the bit assignment is done for plural fixed recording areas such as to reduce the variation in the sound quality of the audio data.

What is claimed is:

1. An encoding method for encoding video material for recording in a plurality of recording areas, comprising:
   a preliminary encoding step prior to ultimate encoding;
   an evaluation step for encoding bit assignment as to allowability of the difference in picture quality between different recording areas under given encoding conditions; and
   a presentation step for presenting an optimum range of bit assignment for which the picture quality difference between different recording areas is allowable;
   wherein ultimate encoding is executed under the given encoding conditions or by the bit assignment of the presented optimum range, and wherein, in said evaluation step, a ratio between the quantity of bits assigned to the respective recording areas under the given encoding conditions and the sum of the encoding difficulty of the respective recording areas is found, using the encoding difficulty of the video material as measured during said preliminary encoding step, and wherein the variation in the picture quality following the encoding of the respective recording areas is estimated based on the variation in said ratio.

2. The encoding method according to claim 1 wherein, in said presentation step, an optimum range of the number of bits to be assigned to each recording area in case the number of frames in each recording area is fixed is displayed if the amount of the ratio variation exceeds a pre-set value.

3. The encoding method according to claim 1 wherein, in said presentation step, an optimum range of the number of frames to be recorded in each recording area in case the quantity of bit assignment in each recording area is fixed is displayed if the amount of the ratio variation exceeds a pre-set value.

4. The encoding method according to claim 1 wherein, in said presentation step, a chapter position of a scene change detection position within the optimum range of the number of frames is detected and displayed as a proper position on the video material on the occasion of newly changing the recording layer boundary.

5. The encoding method according to claim 1 wherein said recording areas are plural recording layers of a digital video disc.

6. An encoding method for encoding a material in which seamless angle blocks are contained in a plurality of recording areas, comprising:
   a step of finding an average rate of encoding difficulty from the sum of the number of bytes and the total number of frames, of which an upper limit accorded from one recording area to another is taken into account;
   a step of securing, from each recording area, the number of bytes assigned to the seamless angle block to be recorded in each recording area in accordance with the ratio of the number of frames which takes a weighting coefficient into account; and
   a step of assigning the residual number of bytes, obtained after deduction cf the number of bytes assigned to the seamless angle blocks, in proportions of the sum of the encoding difficulty in which weighting coefficients are considered for blocks other than the seamless angle blocks.

7. The encoding method according to claim 6 wherein the average rate of the encoded video material is found by a preliminary encoding prior to ultimate encoding.

8. The encoding method according to claim 6 wherein the plural recording layers are plural recording layers of the digital video disc.

9. An encoding apparatus for encoding video material for recording in a plurality of recording areas, comprising:
   preliminary encoding means for doing preliminary encoding prior to ultimate encoding;
   evaluation means for evaluating bit assignment as to allowability of the difference in picture quality between different recording areas under given encoding conditions; and
   presentation means for presenting an optimum range of bit assignment for which the picture quality difference between the different recording areas is allowable;
   wherein ultimate encoding is executed under the given encoding conditions or by the bit assignment of the presented optimum range, and wherein, in said evaluation means, a ratio between the quantity of bits assigned to the respective recording areas under the given encoding conditions and the sum of the encoding difficulty of the respective recording areas is found, using the encoding difficulty of the video material as measured by said preliminary encoding means, and wherein the variation in the picture quality following the encoding of the respective recording areas is estimated based on the variation in said ratio.

10. The encoding method according to claim 9 wherein an optimum range of the number of bits to be assigned to each recording area in case the number of frames in each recording area is fixed is displayed on said presentation means if the amount of the ratio variation exceeds a pre-set value.

11. The encoding method according to claim 9 wherein an optimum range of the number of frames to be recorded in each recording area in case the quantity of bit assignment in each recording area is fixed is displayed on said presentation means if the amount of the ratio variation exceeds a pre-set value.

12. The encoding method according to claim 11 wherein said presentation means detects a chapter position or a scene change detection position within the optimum range of the number of frames and displays the detected position as a proper position on the video material on the occasion of newly changing a recording layer boundary.

13. The encoding method according to claim 9 wherein said recording areas are plural recording layers of a digital video disc.

14. An encoding method for encoding a material in which seamless angle blocks are contained in a plurality of recording areas thereof, comprising:

a step of finding an average rate of the encoded material from the sum of the number of bytes and the total number of frames, an upper limit of each of which accorded from one recording area to another is taken into account;

a step of securing, from each recording area, the number of bytes assigned to the seamless angle block to be recorded in each recording area in accordance with the ratio of the number of frames which takes a weighting coefficient into account; and a step of assigning the residual number of bytes, obtained on deduction of the number of bytes assigned to the seamless angle blocks, to blocks other than the seamless angle blocks in proportions of the sum of encoding difficulty which takes a weighting coefficient into account.

15. The encoding method according to claim 14 wherein the average rate of the encoded video material is found by a preliminary encoding prior to ultimate encoding.

16. The encoding method according to claim 14 wherein the plural recording layers are plural recording layers of the digital video disc.

* * * * *